United States Patent
Le Léannec et al.

(10) Patent No.: US 12,549,731 B2
(45) Date of Patent: Feb. 10, 2026

(54) MATRIX-BASED INTRA PREDICTION WITH ASYMMETRIC BINARY TREE

(71) Applicant: InterDigital CE Patent Holdings, SAS, Paris (FR)

(72) Inventors: Fabrice Le Léannec, Cesson-Sevigne (FR); Karam Naser, Cesson-Sevigne (FR); Thierry Dumas, Cesson-Sevigne (FR); Franck Galpin, Cesson-Sevigne (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 124 days.

(21) Appl. No.: 18/282,330

(22) PCT Filed: Mar. 15, 2022

(86) PCT No.: PCT/EP2022/056732
§ 371 (c)(1),
(2) Date: Sep. 15, 2023

(87) PCT Pub. No.: WO2022/200130
PCT Pub. Date: Sep. 29, 2022

(65) Prior Publication Data
US 2024/0163443 A1    May 16, 2024

(30) Foreign Application Priority Data
Mar. 22, 2021  (EP) .................................. 21305352

(51) Int. Cl.
*H04N 19/132*  (2014.01)
*H04N 19/159*  (2014.01)
(Continued)

(52) U.S. Cl.
CPC ......... *H04N 19/132* (2014.11); *H04N 19/159* (2014.11); *H04N 19/176* (2014.11); *H04N 19/30* (2014.11)

(58) Field of Classification Search
None
See application file for complete search history.

(56) References Cited

U.S. PATENT DOCUMENTS

| | | |
|---|---|---|
| 11,381,808 B2 * | 7/2022 | Lin .................. H04N 19/11 |
| 2012/0237132 A1 | 9/2012 | Kihara et al. |

(Continued)

OTHER PUBLICATIONS

Le Leannec et al., "EE2 Related: Asymmetric Binary Tree Splitting on Top of VVC", Joint Video Experts Team (JVET) of ITU-T SG 16 WP 3 and ISO/IEC JTC 1/SC 29, Document: JVET-V0083, 22nd Meeting, by teleconference, Apr. 20, 2021, 9 pages.

(Continued)

*Primary Examiner* — Lindsay J Uhl
(74) *Attorney, Agent, or Firm* — Xiaoan Lu

(57) ABSTRACT

Several methods are described to jointly use the ABT (Asymmetric Binary Tree) partitioning mode and Matrix-based Intra Prediction (MIP). In a first embodiment, we propose to forbid the use of the MIP intra prediction mode, for block sizes that are resulted from ABT partitioning. In a second embodiment, we propose to allow the MIP intra prediction for block sizes not equal to a power of two in width or height, by extending the block before MIP and crop the predicted block to the original size after MIP. In a third embodiment, we propose to adapt the down-sampling of the boundary reference samples and the up-sampling of the reduced predicted blocks, to the block sizes introduced by ABT partitioning. In a further embodiment, we set the reduced predicted block to size 8×8 in any case the initial block size is 8 and larger than 8 in a direction.

16 Claims, 15 Drawing Sheets

(51) Int. Cl.
*H04N 19/176* (2014.01)
*H04N 19/30* (2014.01)

(56) References Cited

U.S. PATENT DOCUMENTS

| | | | | |
|---|---|---|---|---|
| 2018/0192098 A1* | 7/2018 | Pekkucuksen | ........ | H04N 7/0117 |
| 2018/0205967 A1* | 7/2018 | Kim | ..................... | H04N 19/117 |
| 2019/0342564 A1* | 11/2019 | Kurokawa | ........... | H03K 3/3562 |
| 2020/0344475 A1* | 10/2020 | Zhu | ...................... | H04N 19/119 |
| 2020/0359050 A1 | 11/2020 | Van et al. | | |
| 2021/0063741 A1* | 3/2021 | Riguer | ................... | G06F 3/011 |
| 2023/0396770 A1* | 12/2023 | Zhang | ................... | H04N 19/96 |

OTHER PUBLICATIONS

Pfaff et al., "CE3: Affine linear weighted intra prediction (CE3-4.1, CE3-4.2)", Joint Video Exploration Team (JVET) of ITU-T SG 16 WP 3 and ISO/IEC JTC 1/SC 29/WG 11, Document: JVET-N0217, 14th Meeting, Geneva, Switzerland, Mar. 19, 2019, 17 pages.

Le Leannec (Technicolor) F et al., "CE1: Asymmetric Binary Tree (tests 1.0.1, 1.0.2, 1.0.3, 1.0.4, 8.01 and 8.02)", 11. JVET Meeting Jul. 11, 2018-Jul. 18, 2018; Ljubljana; (The Joint Video Exploraation Team of ISO/IEC JTC1/SC29/WG11 and ITU-T SG.16), No. JVET-K0197, Jul. 10, 2018, 16 pages.

\* cited by examiner

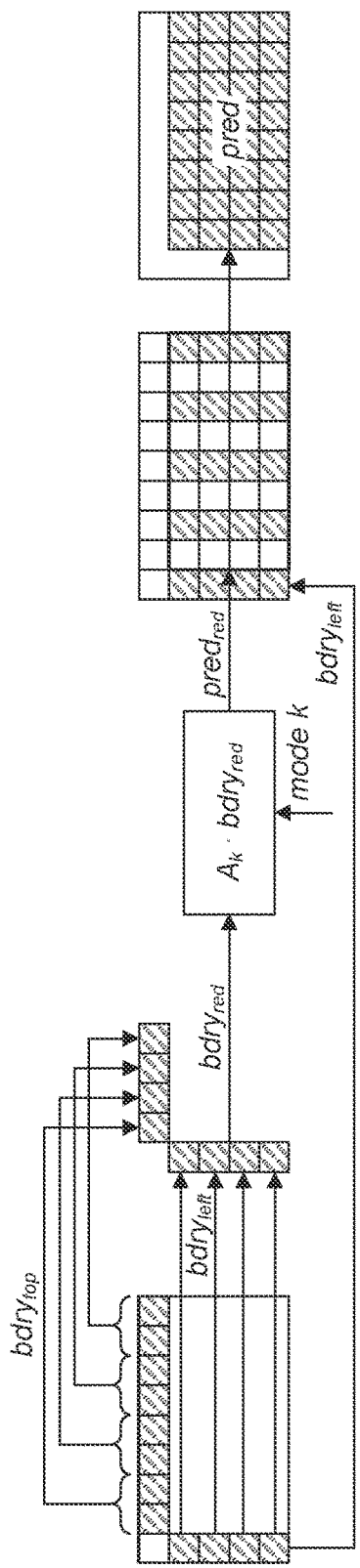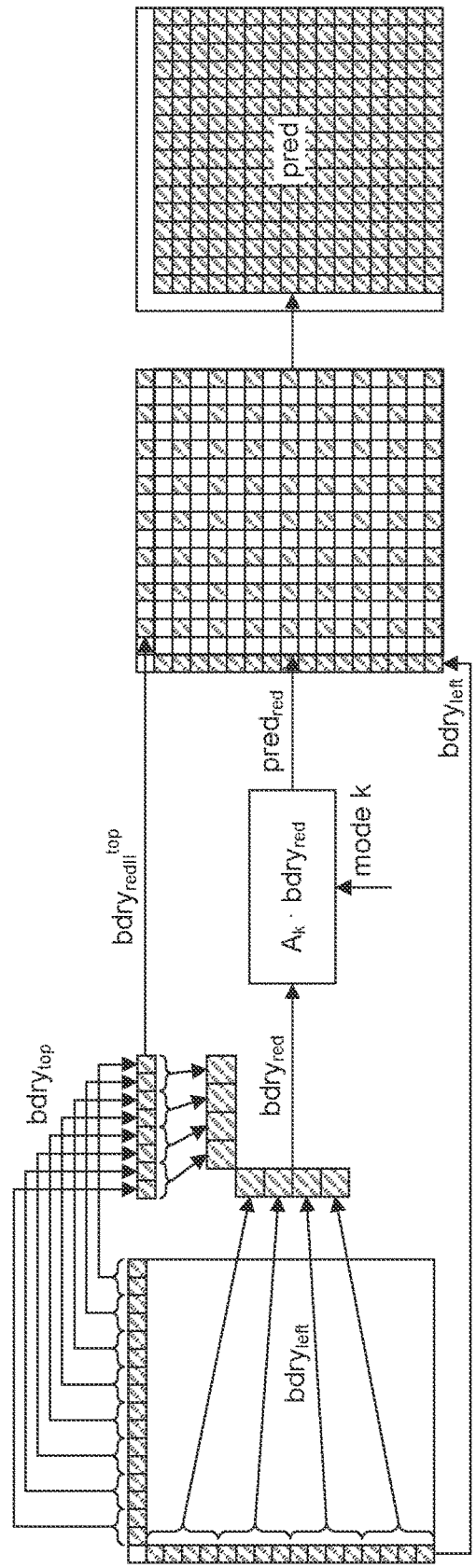
FIG. 13
FIG. 14

MATRIX-BASED INTRA PREDICTION WITH ASYMMETRIC BINARY TREE

CROSS REFERENCE TO RELATED APPLICATIONS

This application is a U.S. National Stage Application under 35 U.S.C. 371 of International Patent Application No. PCT/EP2022/056732, filed Mar. 15, 2022, which is incorporated herein by reference in its entirety.

This application claims the benefit of European Patent Application No. EP21305352.3 filed Mar. 22, 2021, which is incorporated herein by reference in its entirety.

TECHNICAL FIELD

The present embodiments generally relate to a method and an apparatus for matrix-based intra prediction with asymmetric binary tree in video encoding and decoding.

BACKGROUND

To achieve high compression efficiency, image and video coding schemes usually employ prediction and transform to leverage spatial and temporal redundancy in the video content. Generally, intra or inter prediction is used to exploit the intra or inter picture correlation, then the differences between the original block and the predicted block, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

According to an embodiment, a method of video encoding or decoding is provided, comprising: accessing a block of a picture, wherein at least one of a width and a height of said block is different than a power of 2; downsampling reference samples, with a downsampling ratio adapted to said width or height of said block; multiplying the downsampled references by a weight matrix in order to form a reduced predicted block; and upsampling said reduced predicted block, with an upsampling ratio adapted to said width or height of said block to form intra prediction for said block.

According to another embodiment, an apparatus for video encoding or decoding is presented, comprising one or more processors, wherein said one or more processors are configured to: access a block of a picture, wherein at least one of a width and a height of said block is different than a power of 2; downsample reference samples, with a downsampling ratio adapted to said width or height of said block; multiply the downsampled references by a weight matrix in order to form a reduced predicted block; and upsample said reduced predicted block, with an upsampling ratio adapted to said width or height of said block to form intra prediction for said block.

According to another embodiment, an apparatus for video encoding or decoding is presented, comprising: means for accessing a block of a picture, wherein at least one of a width and a height of said block is different than a power of 2; means for downsampling reference samples, with a downsampling ratio adapted to said width or height of said block; means for multiplying the downsampled references by a weight matrix in order to form a reduced predicted block; and means for upsampling said reduced predicted block, with an upsampling ratio adapted to said width or height of said block to form intra prediction for said block.

One or more embodiments also provide a computer program comprising instructions which when executed by one or more processors cause the one or more processors to perform the encoding method or decoding method according to any of the embodiments described above. One or more of the present embodiments also provide a computer readable storage medium having stored thereon instructions for encoding or decoding video data according to the methods described above.

One or more embodiments also provide a computer readable storage medium having stored thereon a bitstream generated according to the methods described above. One or more embodiments also provide a method and apparatus for transmitting or receiving the bitstream generated according to the methods described above.

BRIEF DESCRIPTION OF THE DRAWINGS

FIG. 13 illustrates an affine linear weighted intra prediction process in MIP for an 8×4 block according to the VVC standard.

FIG. 14 illustrates an affine linear weighted intra prediction process in MIP for a 16×16 block according to the VVC standard.

DETAILED DESCRIPTION

Figure 1:
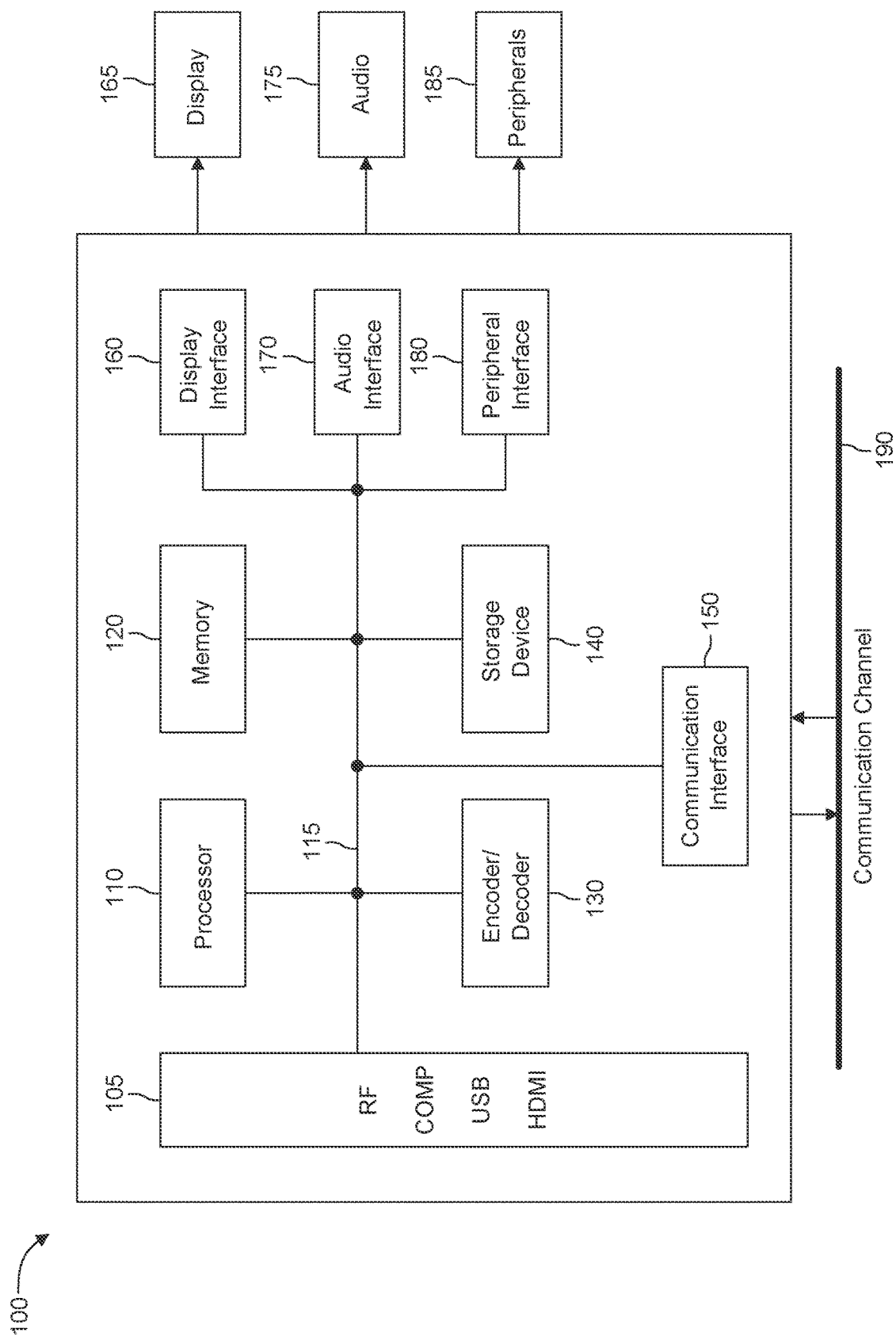
FIG. 1 illustrates a block diagram of a system within which aspects of the present embodiments may be implemented.

FIG. 1 illustrates a block diagram of an example of a system in which various aspects and embodiments can be implemented. System 100 may be embodied as a device including the various components described below and is configured to perform one or more of the aspects described in this application. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 100, singly or in combination, may be embodied in a single integrated circuit, multiple ICs, and/or discrete components. For example, in at least one embodiment, the processing and encoder/decoder elements of system 100 are distributed across multiple ICs and/or discrete components. In various embodiments, the system 100 is communicatively coupled to other systems, or to other electronic devices, via, for example, a communications bus or through dedicated input and/or output ports. In various embodiments, the system 100 is configured to implement one or more of the aspects described in this application.

The system 100 includes at least one processor 110 configured to execute instructions loaded therein for implementing, for example, the various aspects described in this application. Processor 110 may include embedded memory, input output interface, and various other circuitries as known in the art. The system 100 includes at least one memory 120 (e. g., a volatile memory device, and/or a non-volatile memory device). System 100 includes a storage device 140, which may include non-volatile memory and/or volatile memory, including, but not limited to, EEPROM, ROM, PROM, RAM, DRAM, SRAM, flash, magnetic disk drive, and/or optical disk drive. The storage device 140 may include an internal storage device, an attached storage device, and/or a network accessible storage device, as non-limiting examples.

System 100 includes an encoder/decoder module 130 configured, for example, to process data to provide an encoded video or decoded video, and the encoder/decoder module 130 may include its own processor and memory. The encoder/decoder module 130 represents module(s) that may be included in a device to perform the encoding and/or decoding functions. As is known, a device may include one or both of the encoding and decoding modules. Additionally, encoder/decoder module 130 may be implemented as a separate element of system 100 or may be incorporated within processor 110 as a combination of hardware and software as known to those skilled in the art.

Program code to be loaded onto processor 110 or encoder/decoder 130 to perform the various aspects described in this application may be stored in storage device 140 and subsequently loaded onto memory 120 for execution by processor 110. In accordance with various embodiments, one or more of processor 110, memory 120, storage device 140, and encoder/decoder module 130 may store one or more of various items during the performance of the processes described in this application. Such stored items may include, but are not limited to, the input video, the decoded video or portions of the decoded video, the bitstream, matrices, variables, and intermediate or final results from the processing of equations, formulas, operations, and operational logic.

In several embodiments, memory inside of the processor 110 and/or the encoder/decoder module 130 is used to store instructions and to provide working memory for processing that is needed during encoding or decoding. In other embodiments, however, a memory external to the processing device (for example, the processing device may be either the processor 110 or the encoder/decoder module 130) is used for one or more of these functions. The external memory may be the memory 120 and/or the storage device 140, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC.

The input to the elements of system 100 may be provided through various input devices as indicated in block 105. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 105 have associated respective input processing elements as known in the art. For example, the RF portion may be associated with elements suitable for (i) selecting a desired frequency (also referred to as selecting a signal, or band-limiting a signal to a band of frequencies), (ii) down converting the selected signal, (iii) band-limiting again to a narrower band of frequencies to select (for example) a signal frequency band which may be referred to as a channel in certain embodiments, (iv) demodulating the down converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion may include a tuner that performs various of these functions, including, for example, down converting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down converting, and filtering again to a desired frequency band. Various embodiments rearrange the order of the above-described (and other) elements, remove some of these elements, and/or add other elements performing similar or different functions. Adding elements may include inserting elements in between existing elements, for example, inserting amplifiers and an analog-to-digital converter. In various embodiments, the RF portion includes an antenna.

Additionally, the USB and/or HDMI terminals may include respective interface processors for connecting system 100 to other electronic devices across USB and/or HDMI connections. It is to be understood that various aspects of input processing, for example, Reed-Solomon error correction, may be implemented, for example, within a separate input processing IC or within processor 110 as necessary. Similarly, aspects of USB or HDMI interface processing may be implemented within separate interface ICs or within processor 110 as necessary. The demodulated, error corrected, and demultiplexed stream is provided to various processing elements, including, for example, processor 110, and encoder/decoder 130 operating in combination with the memory and storage elements to process the datastream as necessary for presentation on an output device.

Various elements of system 100 may be provided within an integrated housing, Within the integrated housing, the various elements may be interconnected and transmit data therebetween using suitable connection arrangement 115, for example, an internal bus as known in the art, including the I2C bus, wiring, and printed circuit boards.

The system 100 includes communication interface 150 that enables communication with other devices via communication channel 190. The communication interface 150 may include, but is not limited to, a transceiver configured to transmit and to receive data over communication channel 190. The communication interface 150 may include, but is not limited to, a modem or network card and the communication channel 190 may be implemented, for example, within a wired and/or a wireless medium.

Data is streamed to the system 100, in various embodiments, using a Wi-Fi network such as IEEE 802. 11. The Wi-Fi signal of these embodiments is received over the communications channel 190 and the communications interface 150 which are adapted for Wi-Fi communications. The communications channel 190 of these embodiments is typically connected to an access point or router that provides access to outside networks including the Internet for allowing streaming applications and other over-the-top communications. Other embodiments provide streamed data to the system 100 using a set-top box that delivers the data over the HDMI connection of the input block 105. Still other embodiments provide streamed data to the system 100 using the RF connection of the input block 105.

The system 100 may provide an output signal to various output devices, including a display 165, speakers 175, and other peripheral devices 185. The other peripheral devices 185 include, in various examples of embodiments, one or more of a stand-alone DVR, a disk player, a stereo system, a lighting system, and other devices that provide a function based on the output of the system 100. In various embodiments, control signals are communicated between the system 100 and the display 165, speakers 175, or other peripheral devices 185 using signaling such as AV. Link, CEC, or other communications protocols that enable device-to-device control with or without user intervention. The output devices may be communicatively coupled to system 100 via dedicated connections through respective interfaces 160, 170, and 180. Alternatively, the output devices may be connected to system 100 using the communications channel 190 via the communications interface 150. The display 165 and speakers 175 may be integrated in a single unit with the other components of system 100 in an electronic device, for example, a television. In various embodiments, the display interface 160 includes a display driver, for example, a timing controller (T Con) chip.

The display 165 and speaker 175 may alternatively be separate from one or more of the other components, for example, if the RF portion of input 105 is part of a separate set-top box. In various embodiments in which the display 165 and speakers 175 are external components, the output signal may be provided via dedicated output connections, including, for example, HDMI ports, USB ports, or COMP outputs.

Figure 2:
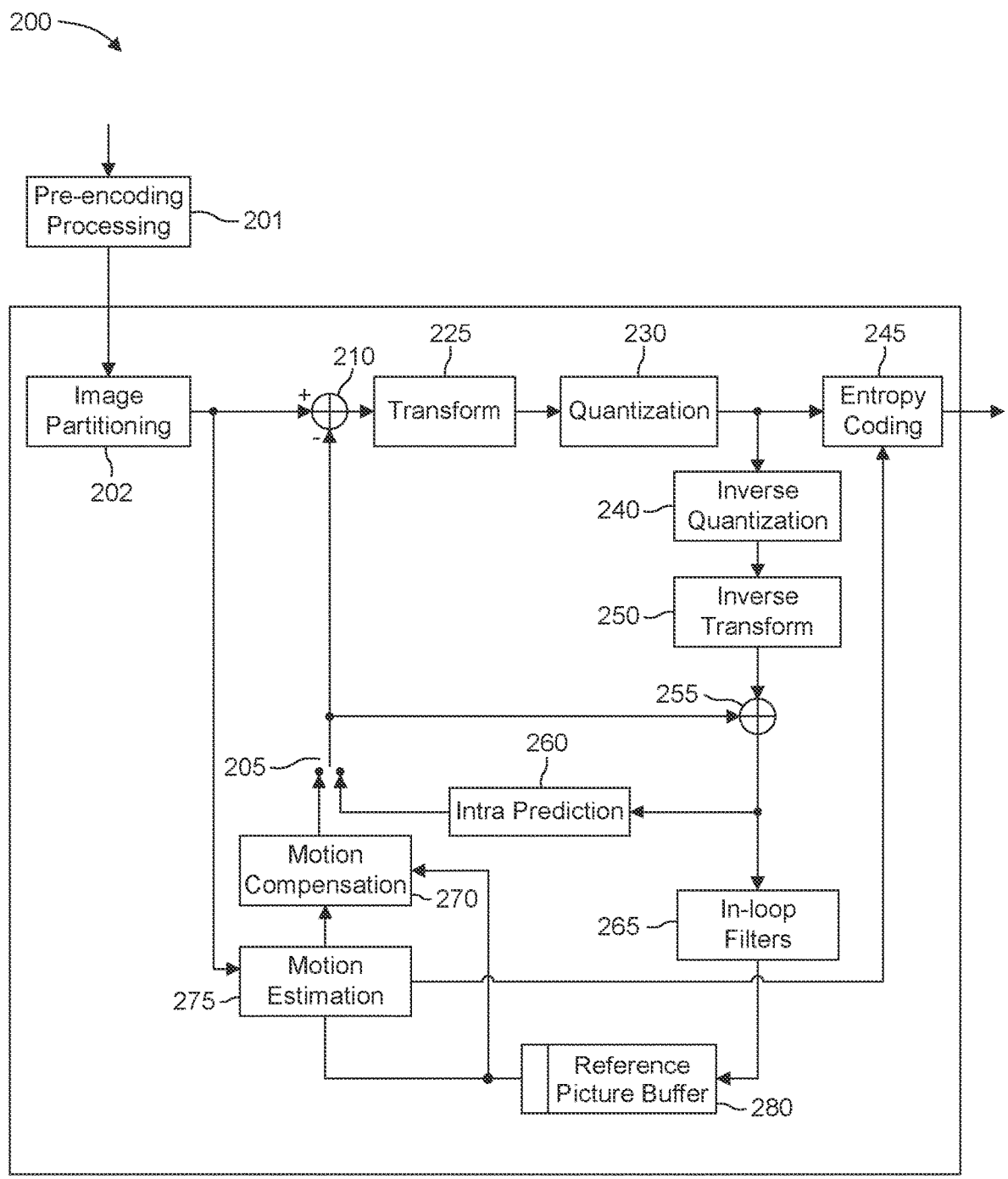
FIG. 2 illustrates a block diagram of an embodiment of a video encoder.

FIG. 2 illustrates an example video encoder 200, such as a VVC (Versatile Video Coding) encoder. FIG. 2 may also illustrate an encoder in which improvements are made to the VVC standard or an encoder employing technologies similar to VVC.

In the present application, the terms "reconstructed" and "decoded" may be used interchangeably, the terms "encoded" or "coded" may be used interchangeably, and the terms "image," "picture" and "frame" may be used interchangeably. Usually, but not necessarily, the term "reconstructed" is used at the encoder side while "decoded" is used at the decoder side.

Before being encoded, the video sequence may go through pre-encoding processing (201), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 200, a picture is encoded by the encoder elements as described below. The picture to be encoded is partitioned (202) and processed in units of, for example, CUs. Each unit is encoded using, for example, either an intra or inter mode. When a unit is encoded in an intra mode, it performs intra prediction (260). In an inter mode, motion estimation (275) and compensation (270) are performed. The encoder decides (205) which one of the intra mode or inter mode to use for encoding the unit, and indicates the intra/inter decision by, for example, a prediction mode flag. Prediction residuals are calculated, for example, by subtracting (210) the predicted block from the original image block.

The prediction residuals are then transformed (225) and quantized (230). The quantized transform coefficients, as well as motion vectors and other syntax elements, are entropy coded (245) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (240) and inverse transformed (250) to decode prediction residuals. Combining (255) the decoded prediction residuals and the predicted block, an image block is reconstructed. In-loop filters (265) are applied to the reconstructed picture to perform, for example, deblocking/SAO (Sample Adaptive Offset) filtering to reduce encoding artifacts. The filtered image is stored at a reference picture buffer (280).

Figure 3:
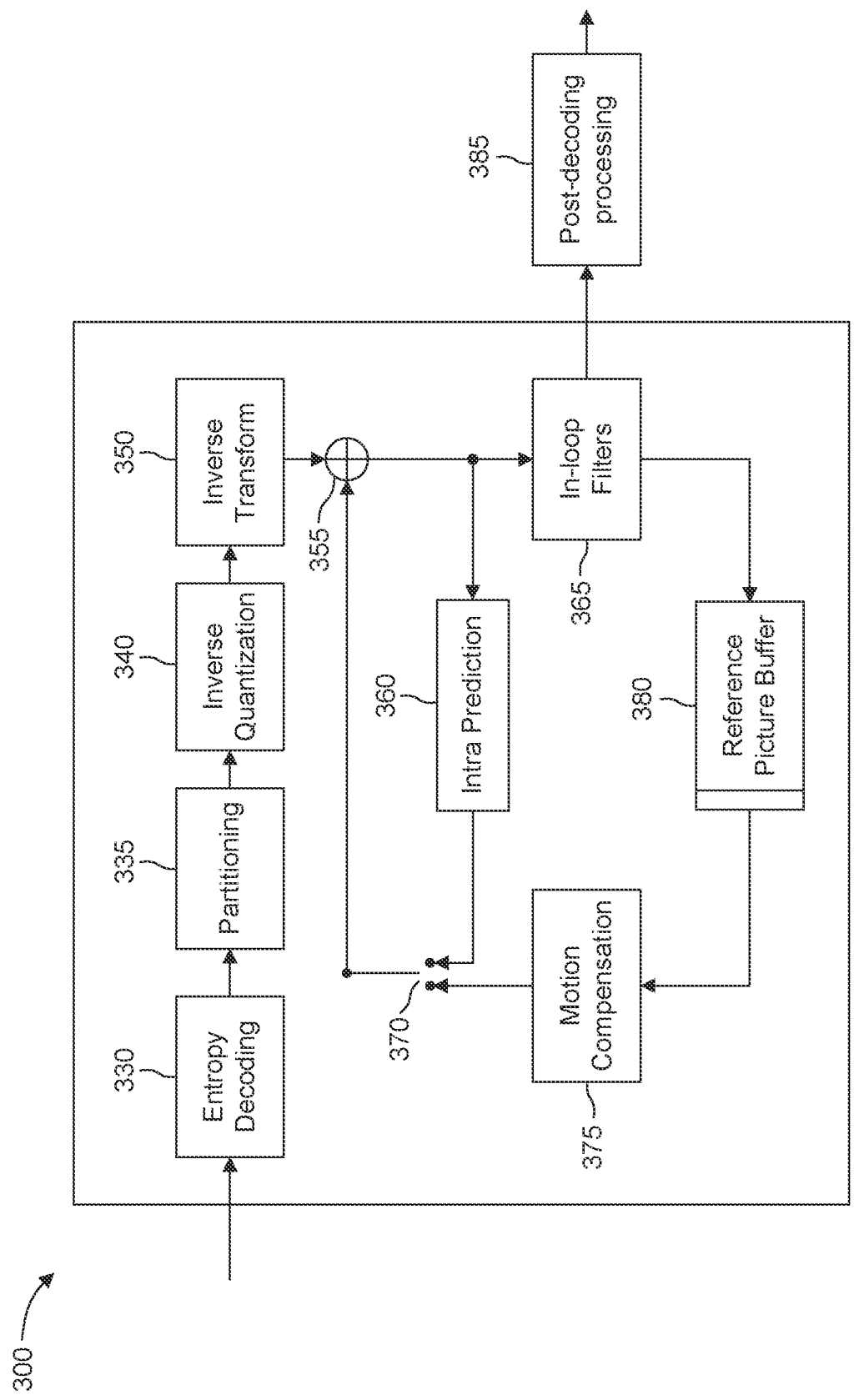
FIG. 3 illustrates a block diagram of an embodiment of a video decoder.

FIG. 3 illustrates a block diagram of an example video decoder 300. In the decoder 300, a bitstream is decoded by the decoder elements as described below. Video decoder 300 generally performs a decoding pass reciprocal to the encoding pass as described in FIG. 2. The encoder 200 also generally performs video decoding as part of encoding video data.

In particular, the input of the decoder includes a video bitstream, which can be generated by video encoder 200. The bitstream is first entropy decoded (330) to obtain transform coefficients, motion vectors, and other coded information. The picture partition information indicates how the picture is partitioned. The decoder may therefore divide (335) the picture according to the decoded picture partitioning information. The transform coefficients are de-quantized (340) and inverse transformed (350) to decode the prediction residuals. Combining (355) the decoded prediction residuals and the predicted block, an image block is reconstructed. The predicted block can be obtained (370) from intra prediction (360) or motion-compensated prediction (i.e., inter prediction) (375). In-loop filters (365) are applied to the reconstructed image. The filtered image is stored at a reference picture buffer (380).

The decoded picture can further go through post-decoding processing (385), for example, an inverse color transform (e.g., conversion from YCbCr 4:2:0 to RGB 4:4:4) or an inverse remapping performing the inverse of the remapping process performed in the pre-encoding processing (201). The post-decoding processing can use metadata derived in the pre-encoding processing and signaled in the bitstream.

Figure 4:
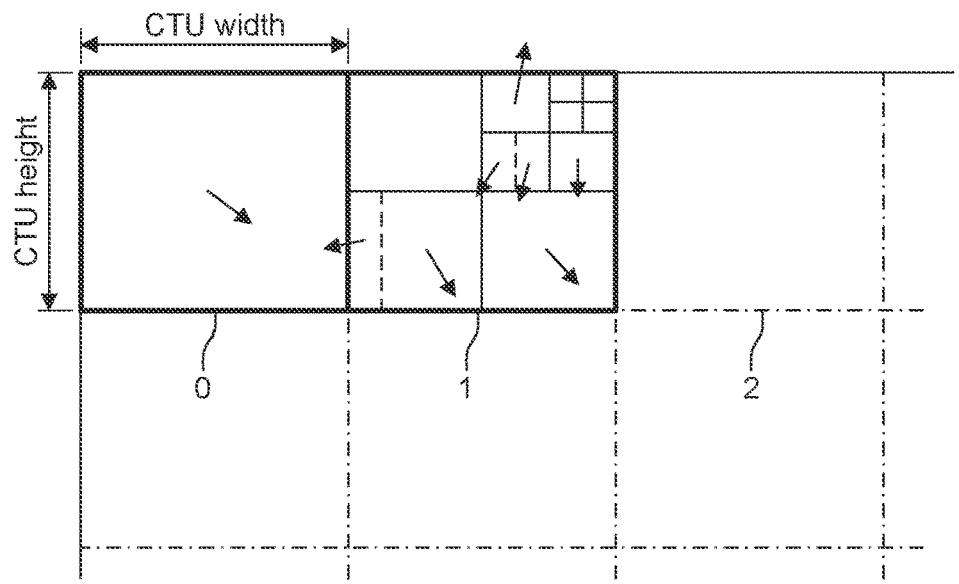
FIG. 4 illustrates Coding Tree Unit (CTU) and Coding Unit (CU) concepts to represent a compressed VVC picture.

In the HEVC video compression standard, a picture is divided into so-called Coding Tree Units (CTU), whose size is typically 64×64, 128×128, or 256×256 pixels. Each CTU is represented by a Coding Tree in the compressed domain. As illustrated in FIG. 4, the coding tree is a quad-tree division of the CTU, where each leaf is called a Coding Unit (CU).

Figure 5:
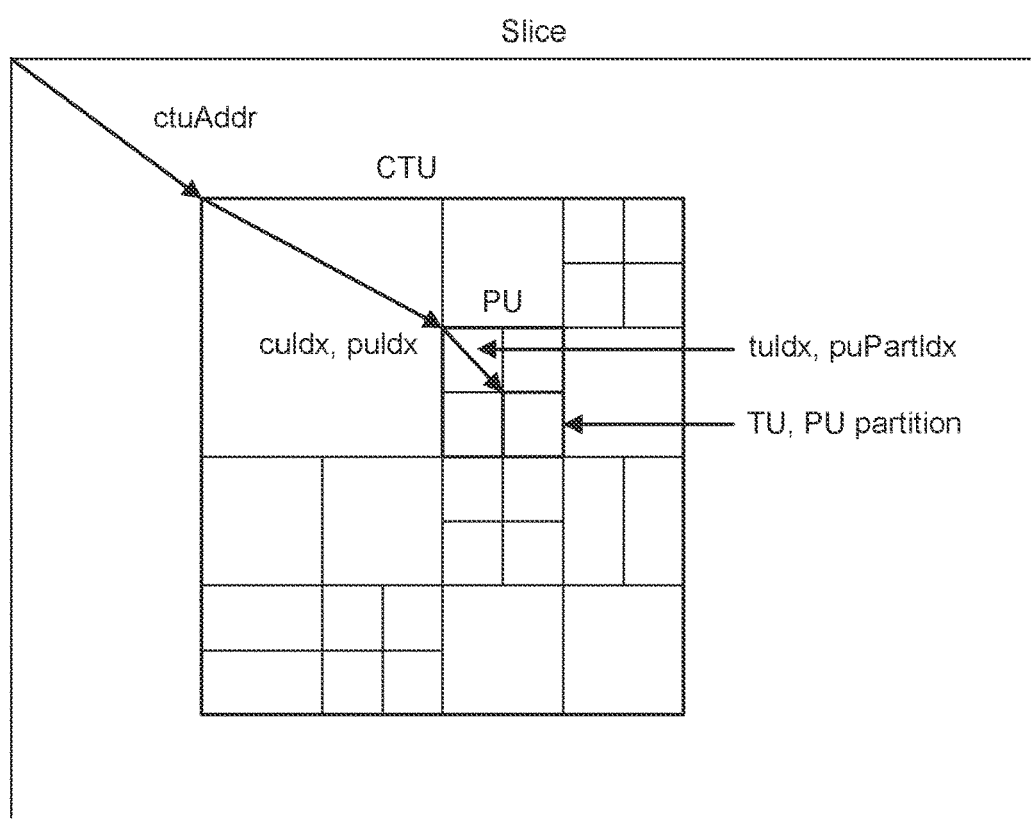
FIG. 5 illustrates division of a Coding Tree Unit into Coding Units, Prediction Units and Transform Units.

Each CU is then given some Intra or Inter prediction parameters (Prediction Info). To do so, a CU is spatially partitioned into one or more Prediction Units (PUs), each PU being assigned some prediction information. The Intra or Inter coding mode is assigned on the CU level, as illustrated in FIG. 5.

Figure 6:
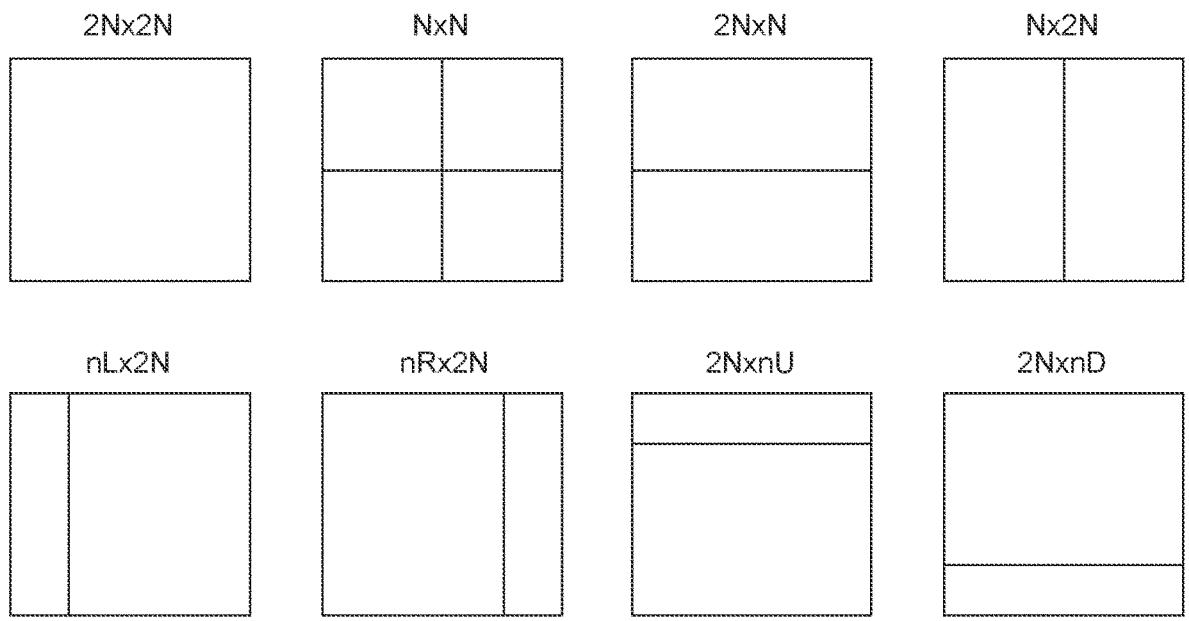
FIG. 6 illustrates partitioning of Coding Units into Prediction Units.

The partitioning of a Coding Unit into Prediction Unit(s) is done according to the partition type, signaled in the bit-stream. For Intra coding unit, only the partition types 2 N×2 N and N×N, as illustrated in FIG. 6, are used. This means only square Prediction Units are used in Intra Coding Units. On the contrary, Inter Coding Units can use all partition types as shown in FIG. 6.

According to the HEVC standard, Coding Units are also divided into so-called transform units, in a recursive way, following a transform tree. Thus, a transform tree is a quad-tree division of a coding unit, and transform units are the leaf of the transform tree. A transform unit encapsulates the square transform blocks of each picture component corresponding to a considered square spatial area. A transform block is a square block of samples in a single component, where the same transform is applied.

Figure 7:
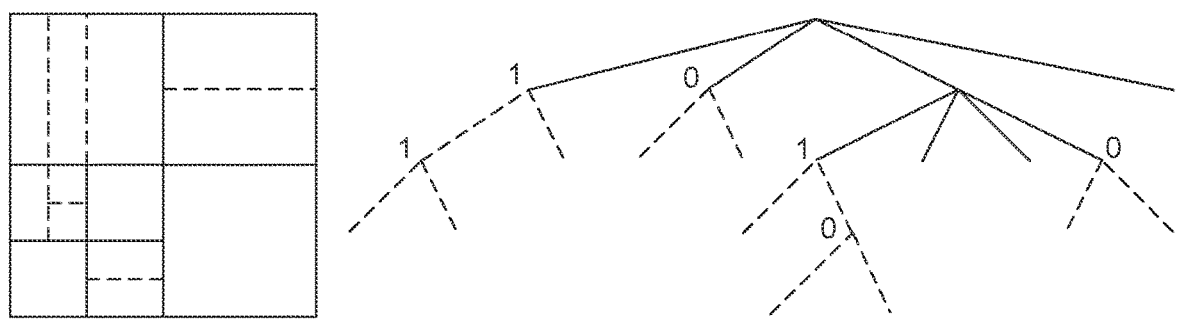
FIG. 7 illustrates Quad-Tree Plus Binary-Tree (QTBT) CTU representation in VVC.

Quad-Tree plus Binary-Tree (QTBT) is proposed in VVC, in order to represent picture data in a more flexible way in the compressed domain. QTBT consists in a coding tree where coding units can be split both in a quad-tree and in a binary-tree fashion, as illustrated in FIG. 7. The advantage of this flexible representation of the coding tree is that it provides increased compression efficiency compared to the CU/PU/TU arrangement of the HEVC standard.

The splitting of a coding unit is decided at the encoder side, for example, through a rate distortion optimization procedure, which consists in determining the QTBT representation of the CTU with minimal rate distortion cost.

In the QTBT technology, a CU has either square or rectangular shape. The size of coding unit is always a power of 2, and typically goes from 4 to 128. In additional to this variety of rectangular shapes for a coding unit, this CTU representation has the following different characteristics compared to HEVC.

The QTBT decomposition of a CTU is made of two stages: first the CTU is split in a quad-tree fashion, then each quad-tree leaf can be further divided in a binary fashion. This is illustrated in FIG. 7, where solid lines represent the quad-tree decomposition phase and dashed lines represent the binary decomposition that is spatially embedded in the quad-tree leaves.

In intra slices, the Luma and Chroma block partitioning structure is separated, and decided independently.

For most coding units in VVC draft 6, for most CU coding modes, no more CU partitioning into predictions units or transform unit is employed. In other words, each Coding Unit is systematically made of a single prediction unit (2 N×2 N prediction unit partition type) and single transform unit (no division into a transform tree). This is true for all VVC coding units except in 4 specific coding modes of VVC draft 6, where the following PU or TU partitioning applies.

In the case of a CU larger than 64 in width or height, a tiling of the CU into TU of size equal to the maximum supported transform size is performed. Typically, the maximum transform size may be equal to 64.

In the case of an intra CU coded in ISP (intra subpartition) mode, the CU is split into 2 or 4 transform units, depending on the type of ISP mode used and the shape of the CU.

In the case of an inter CU coded in SBT (sub-block transform) mode, the CU is split into 2 transform units, one of the resulting TU having necessarily residual data equal to zero.

In the case of an inter CU coded in Geometric Prediction Merge (GPM) mode, the CU is made of 2 non-rectangular prediction units, each PU being assigned its own motion data.

Figure 8:
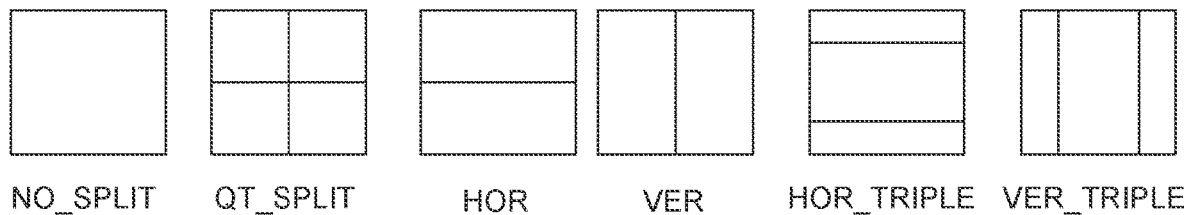
FIG. 8 illustrates a set of CU splitting modes.

An additional CU split mode adopted in the VVC video compression standard, called the horizontal or vertical triple tree splitting mode, consists in dividing a coding unit (CU) into 3 sub-coding-units (sub-CUs), with respective sizes equal to ¼, ½ and ¼ of the parent CU size in the direction of the considered spatial division. The complete set of CU splitting modes present in such a VVC codec is shown in FIG. 8.

Figure 9:
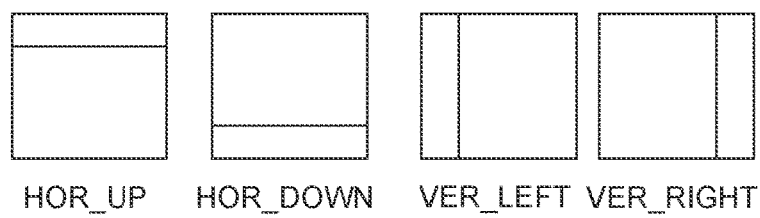
FIG. 9 illustrates the additional CU binary asymmetric splitting modes introduced by the Asymmetric Binary Tree (ABT) coding tool.

As shown in FIG. 9, asymmetric coding units may be used in the Asymmetric Binary Tree (ABT) mode. In particular, it is proposed to introduce coding units with new rectangular shapes, which result from a binary splitting mode called asymmetric splitting mode. These new shapes consist in sizes equal to $3 \cdot 2^n$ in width and/or height. Furthermore, a CU with a size multiple of 3 in width or height can be further split in a binary fashion, horizontally or vertically.

As a consequence, a square coding unit with size (w, h) (width and height) that would be split through one of the proposed asymmetric binary splitting modes, for example HOR UP (horizontal-up), would lead to 2 sub-coding units with respective rectangular sizes $$\left(w, \frac{h}{4}\right)$$

and $$\left(w, \frac{3h}{4}\right),$$

Figure 10:
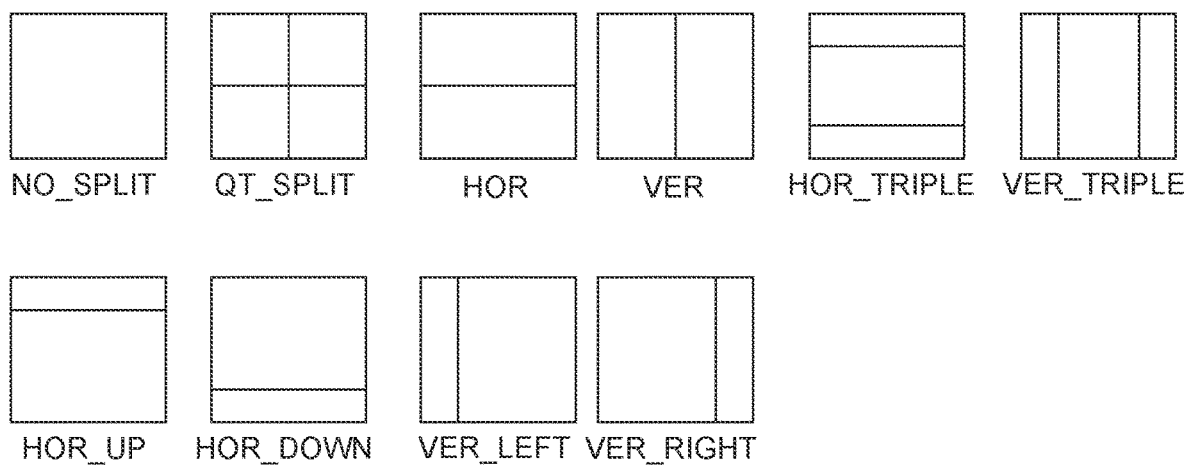
FIG. 10 illustrates an extended set of possible CU split modes, including the horizontal and vertical triple tree split mode.

When using all split modes from VVC and all ABT split modes, the set of possible partitions supported in the envisioned coding scheme is given in FIG. 10. Triple tree consists in splitting a CU into three sub-CUs with size (¼,½,¼) relative to the parent CU, in the considered orientation.

When tested, it is observed that triple tree and asymmetric binary tree split modes are often used, and that these additional coding unit topologies help in having coding structures that spatially match the structures and discontinuities contained in the original signal.

In this application, we propose adaptations of some VVC coding tools, when introducing the Asymmetric Binary Tree (ABT) split modes on top of the VVC compression system. In one embodiment, a method is proposed to efficiently combine the use of ABT partitioning with the Matrix Based Intra Prediction (MIP) tool in VVC.

Matrix Intra Prediction (MIP)

Matrix weighted intra prediction (MIP) method is an intra prediction technique newly added into VVC. To predict the samples of a block of width W and height H, matrix weighted intra prediction takes one line of H reconstructed neighbouring boundary samples left of the block and one line of W reconstructed neighbouring boundary samples above the block as input. The generation of the prediction signal is based on averaging neighboring samples, matrix vector multiplication with the averaged samples and linear interpolation.

In particular, for MIP, the reference sample generation process consists in taking exclusively the W reconstructed top and H reconstructed left pixels. These reference samples are not filtered. The reference samples are averaged, resulting in a vector of 4 values in the case of W=H=4 and 8 values for bigger blocks. The vector of averaged reference samples is multiplied with a matrix of weights. The result is a reduced prediction signal on a subsampled set of samples in the original block. Finally, the prediction of the current block is obtained by linearly interpolating the result from the previous step. The initial reference samples are used for interpolating the boundaries.

Three sets of matrices and vectors ($S_0$, $S_1$, $S_2$) are available for the encoder to select. For blocks of size 4×4, the set $S_0$ contains 16 matrices of size 16×4. For blocks of sizes 4×8, 8×4 and 8×8, $S_1$ consists of 8 matrices of size 16×8. For all other block shapes, the set $S_2$ consists of 6 matrices of size 64×8.

By averaging neighboring reference samples, the reference samples are reduced to smaller boundaries $$bdry_{red}^{top} \text{ and } bdry_{red}^{left}$$

at the top and at the left, which are concatenated to a reduced boundary vector $bdry_{red}$. Depending on the MIP mode and the block shape, the vector of input, the reduced boundary $bdry_{red}$ is rearranged as follows:

$$bdry_{red} = \begin{cases} [bdry_{res}^{top}, bdry_{red}^{left}] \\ [bdry_{res}^{left}, bdry_{red}^{top}] \end{cases}$$

if syntax element intra_mip_transpose_flag is equal to 0 if syntax element intra_mip_transpose_flag is equal to 1

Then the output reduced set $pred_{red}$ of samples for the predicted blocks is generated as $$pred_{red} = A \cdot bdry_{red}.$$

Figure 11:
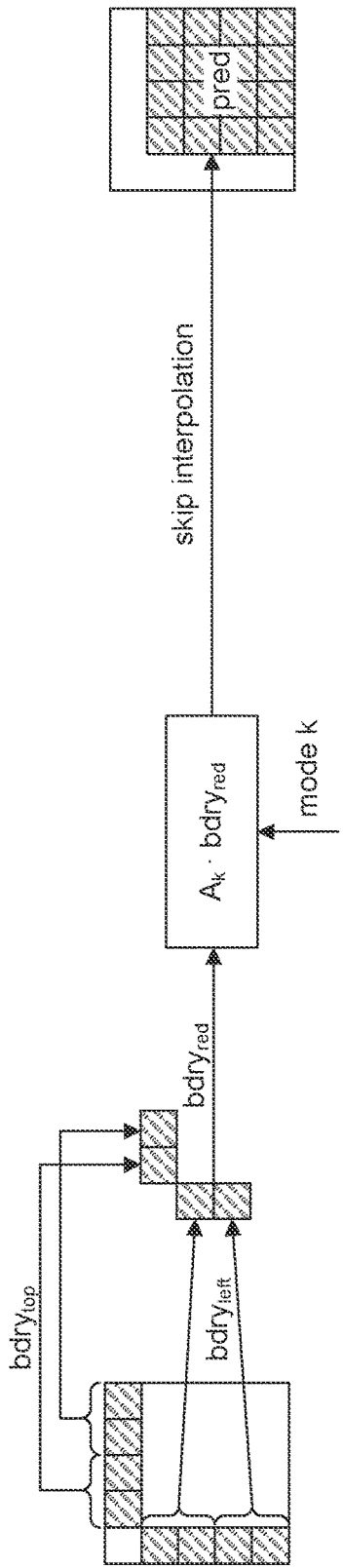
FIG. 11 illustrates an affine linear weighted intra prediction process in Matrix-based Intra Prediction (MIP) for a 4×4 block according to the VVC standard.

The MIP process for a 4×4 block is illustrated in FIG. 11. Note that the reduced predicted block of FIG. 11 is always a square shape, and its size is given as follows:

$$redPredSize = \begin{cases} 4 & \text{if } idx(W, H) < 2 \\ 8 & \text{otherwise} \end{cases}$$

where $$idx(W, H) = \begin{cases} 0 & \text{for } W = H = 4 \\ 1 & \text{for } W = 4 \text{ or } H = 4 \text{ or } (W = 8 \text{ and } H = 8) \\ 2 & \text{otherwise} \end{cases}$$

The matrix of weights A and the offset vector b are selected among the sets $S_0$, $S_1$, $S_2$ depending on the mode and block shape as $$A = A_{idx}^m$$

where idx=idx(W, H) and m is equal to the MIP prediction mode.

Figure 12:
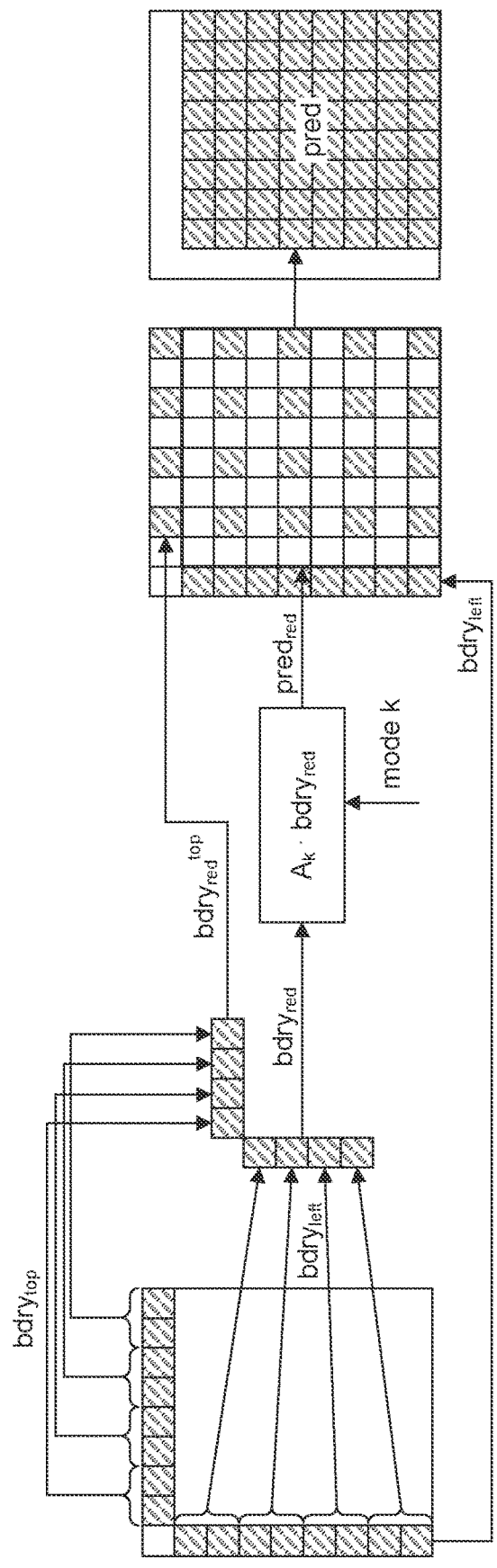
FIG. 12 illustrates an affine linear weighted intra prediction process in MIP for an 8×8 block according to the VVC standard.

The interpolation processes that are performed on $pred_{red}$ in the case of an 8×8 and 8×4 block are shown in FIG. 12 and FIG. 13, respectively. For larger blocks, the reference samples are grouped and averaged so that the input vector is 8 samples long, as shown in FIG. 14 for a 16×16 block.

This method requires to store the sets $S_0$, $S_1$, $S_2$ which correspond to 16 matrices of size 16×4 and 18 offsets of size 16, 8 matrices of size 16×8 and 10 offsets of size 16, 6 matrices of size 64×8 and 6 offsets of size 64.

Figure 15:
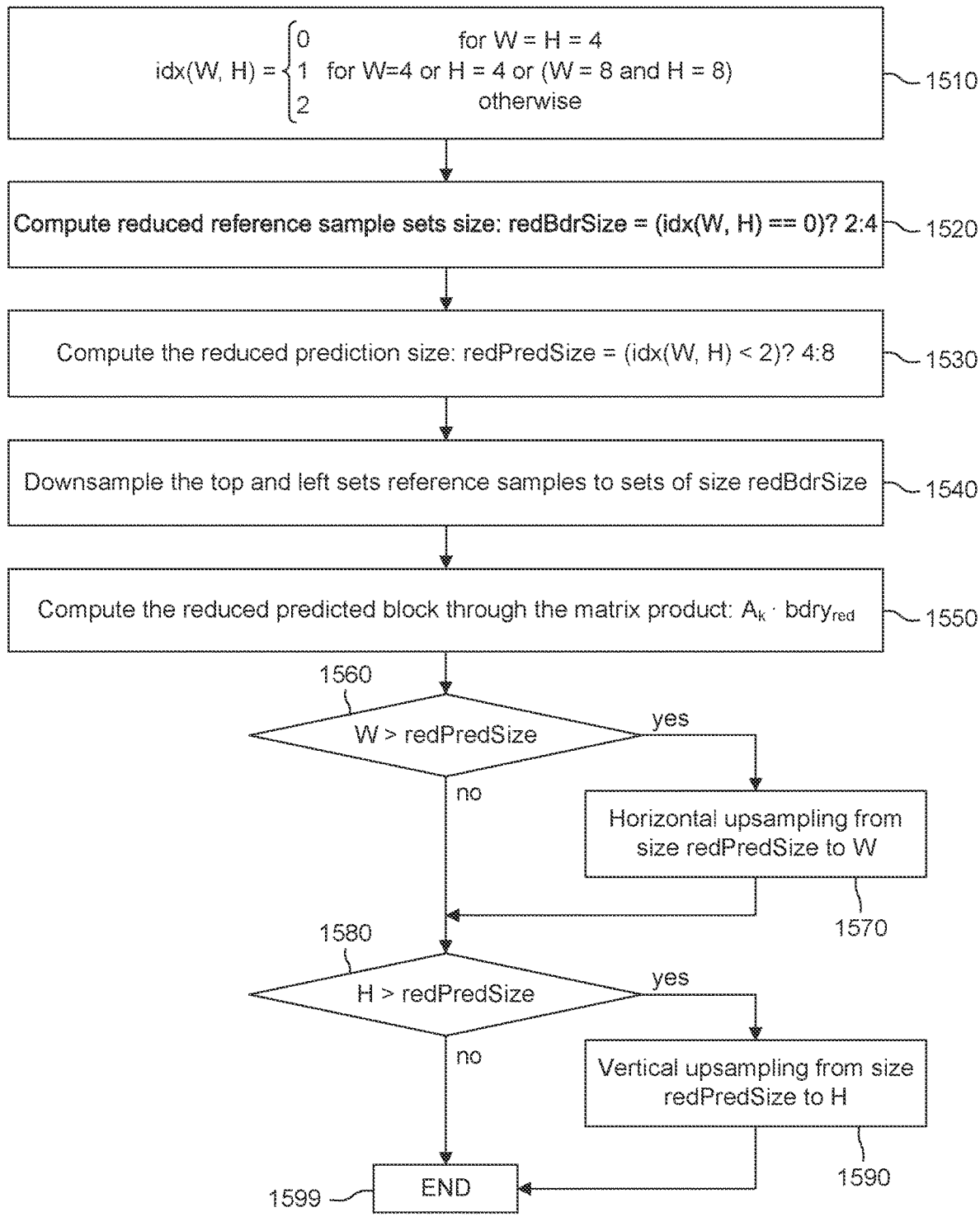
FIG. 15 illustrates an MIP prediction process as specified in VVC.

FIG. 15 depicts the overall MIP prediction process applied to a block, on the encoder and on the decoder sides, as specified in VVC. The input to the process is a luma block (or luma coding block) to predict. At step 1510, the encoder or decoder determines the MIP size parameter, idx(W, H), of the considered luma block, as a function of the block size and shape, where W and H respectively stand for the width and height of the input luma block. It is determined as:

$$idx(W, H) = \begin{cases} 0 & \text{for } W = H = 4 \\ 1 & \text{for } W = 4 \text{ or } H = 4 \text{ or } (W = 8 \text{ and } H = 8) \\ 2 & \text{for } \max(W, H) > 8 \end{cases}.$$

By down-sampling the two sets of top and left reference samples of current luma block used for its intra prediction, these two sets of top and left reference samples are reduced to two sets of equal sizes. This size, noted redBdrSize, is equal to 2 or 4, and is determined (1520) as redBdrSize=(idx(W,H)==0)?2:4.

The reduced prediction size is calculated at step 1530. Then the two sets of reference samples are down-sampled (1540), through a simple averaging down-sampling process.

For instance, if the down-sampling ratio is 4 between the initial set of reference samples and the reduced one, then each sample of the reduced one is computed as an average of 4 samples in the initial set, whose spatial positions correspond to the current computed sample of the reduced set.

At step 1550, the reduced predicted block is computed, through the matrix product-based prediction of MIP. The reduced predicted block is thus obtained as $A_k \cdot \text{pred}_{red} = \text{bdry}_{red}$.

The final prediction of the current luma block is computed by up-sampling the reduced predicted block, towards the size of the current luma block (W,H). This up-sampling involves a simple bi-linear interpolation process. In other words, each sample of the up-sampled predicted block is computed as a weighted average of the two samples of the reduced predicted block, which surrounds it in terms of spatial location. Up-sampling is performed firstly in the horizontal direction (1560, 1570) and then in the vertical direction (1580, 1590) regardless of block shape or block size. The method ends at step 1599.

The current specification is shown in Table 1 (underlined part for MIP). For each Coding Unit (CU) in intra mode, a flag indicating whether an MIP mode is to be applied or not is sent. If an MIP mode is to be applied, MIP mode (predModeIntra derived from syntax element intra_mip_mode) is signaled. For an MIP mode, a transposed flag (isTransposed), which determines whether the mode is transposed, and MIP mode Id (modeId), which determines which matrix is to be used for the given MIP mode is derived as follows:

isTransposed=intra_mip_transposed_flag[x0][y0]

modeId=intra_mip_mode[x0][y0]

MIP coding mode is harmonized with other coding tools by considering following aspects:

LFNST is enabled for MIP on large blocks. Here, the LFNST transforms of planar mode are used.

The reference sample derivation for MIP is performed exactly as for the conventional intra prediction modes.

For the upsampling step used in the MIP-prediction, original reference samples are used instead of down-sampled ones.

Clipping is performed before upsampling and not after upsampling.

MIP is allowed up to 64×64 regardless of the maximum transform size.

The number of MIP modes is 32 for sizeId=0, 16 for sizeId=1 and 12 for sizeId=2.

TABLE 1

|  | Descriptor |
|---|---|
| coding_unit( x0, y0, cbWidth, cbHeight, cqtDepth, treeType, modeType ) { <br>  if( sh_slice_type = = I && ( cbWidth > 64 \|\| cbHeight > 64 ) ) <br>    modeType = MODE_TYPE_INTRA <br>... <br>  if( CuPredMode[ chType ][ x0 ][ y0 ] = = MODE_INTRA \|\| <br>    CuPredMode[ chType ][ x0 ][ y0 ] = = MODE_PLT ) { <br>    if( treeType = = SINGLE_TREE \|\| treeType = = DUAL_TREE_LUMA ) { <br>      if( pred_mode_plt_flag ) <br>        palette_coding( x0, y0, cbWidth, cbHeight, treeType ) <br>      else { <br>        if( sps_bdpcm_enabled_flag && cbWidth <= MaxTsSize && <br>          cbHeight <= MaxTsSize ) <br>          intra_bdpcm_luma_flag | ae(v) |
|         if( intra_bdpcm_luma_flag ) <br>          intra_bdpcm_luma_dir_flag | ae(v) |
|         else { <br>          if( sps_mip_enabled_flag ) <br>            <u>intra_mip_flag</u> | <u>ae(v)</u> |
|           <u>if( intra_mip_flag ) {</u> <br>            <u>intra_mip_transposed_flag[ x0 ][ y0 ]</u> | <u>ae(v)</u> |
|             <u>intra_mip_mode[ x0 ][ y0 ]</u> | <u>ae(v)</u> |
|         } else { <br>... <br>} |  |

First Embodiment: Normative Mutual Exclusion Between MIP and ABT

In the first embodiment, we propose to forbid the use of the MIP intra prediction mode, for block sizes that are not currently supported by MIP in the VVC specification. Thus, if the current luma block size is not a power of 2 in width or height, then MIP is not used for that block. In such case, the intra_mip_flag syntax element is not signaled in the bit-stream, and is inferred to false by the decoder.

Table 2 shows the proposed modification to the VVC syntax used to signal the MIP usage at luma coding block level. As can be seen, the condition to signal the intra_mip_flag syntax element is modified to be:

sps_mip_enabled_flag && (cbWidth & (cbWidth−1))==0 && (cbHeight & (cbHeight−1))==0 which means that MIP has to be activated at sequence level (as in VVC specification), and the two following conditions have to be true:

(cbWidth & (cbWidth−1))==0

(cbHeight & (cbHeight−1))==0 where, (cbWidth & (cbWidth−1)) represents bitwise logical AND operation between cbWidth and (cbWodth−1). The condition (cbWidth & (cbWidth−1))==0 is true if and only if cbWidth is a power of two. Thus, the intra_mip_flag element is signaled if both the width and height of the luma coding block are equal to a power of 2.

TABLE 2

| | Descriptor |
|---|---|

```
Coding_unit( x0, y0, cbWidth, cbHeight, cqtDepth, treeType, modeType ) {
    ...
    if( CuPredMode[ chType ][ x0 ][ y0 ] = = MODE_INTRA
        && sps_act_enabled_flag && treeType = = SINGLE_TREE )
        cu_act_enabled_flag                                                    ae(v)
    if( CuPredMode[ chType ][ x0 ][ y0 ] = = MODE_INTRA | |
        CuPredMode[ chType ][ x0 ][ y0 ] = = MODE_PLT ) {
        if( treeType = = SINGLE_TREE | | treeType = = DUAL_TREE_LUMA ) {
            if( pred_mode_plt_flag ) {
                palette_coding( x0, y0, cbWidth, cbHeight, treeType )
            } else {
                if( sps_bdpcm_enabled_flag &&cbWidth <= MaxTsSize &&
                    cbHeight <= MaxTsSize )
                    intra_bdpcm_luma_flag                                      ae(v)
                if( intra_bdpcm_luma_flag )
                    intra_bdpcm_luma_dir_flag                                  ae(v)
                else {
                    if( sps_mip_enabled_flag && (cbWidth & (cbWidth - 1))==0
                        && (cbHeight & (cbHeight - 1))==0 )
                        intra_mip_flag[ x0 ][ y0 ]                             ae(v)
                    if( intra_mip_flag[ x0 ][ y0 ] ) {
                        intra_mip_transposed[ x0 ][ y0 ]                       ae(v)
                        intra_mip_mode[ x0 ][ y0 ]                             ae(v)
                    } else {
                        if( sps_mrl_enabled_flag && ( ( y0 % CtbSizeY ) > 0 ) )
                            intra_luma_ref_idx[ x0 ][ y0 ]                     ae(v)
                        if( sps_isp_enabled_flag && intra_luma_ref_idx[ x0 ][ y0 ] = = 0 &&
                            ( cbWidth <= MaxTbSizeY && cbHeight <= MaxTbSizeY ) &&
                            ( cbWidth * cbHeight > MinTbSizeY * MinTbSizeY ) &&
                            !cu_act_enabled_flag )
                            intra_subpartitions_mode_flag[ x0 ][ y0 ]          ae(v)
                        if( intra_subpartitions_mode_flag[ x0 ][ y0 ] = = 1 )
                            intra_subpartitions_split_flag[ x0 ][ y0 ]         ae(v)
                        ...
                    }
                }
            }
        }
    }
}
```

In terms of encoding process, the present embodiment implies that during the intra prediction mode decision for a luma coding block with a size different from a power of 2 in width or height, the MIP intra prediction mode is not evaluated at all as a candidate prediction mode.

Second Embodiment: Treating the ABT Block to Predict as a Larger Block, and Crop the MIP-Predicted Block In the second embodiment, we propose to allow the MIP intra prediction for block sizes not equal to a power of two in width or height. To do so, the MIP prediction process is used to predict a block larger than the current block size. This is possible through the padding of the lines of top and left reference samples, which already takes place in the VVC intra prediction process for angular intra prediction modes. Therefore, the MIP mode computes a predicted block larger than the current luma block, by means of the extended top and left reference samples. Then the predicted luma block is cropped to the size of the current luma block. This provides the final predicted luma block with a size not equal to a power of 2 in width or height.

Figure 16:
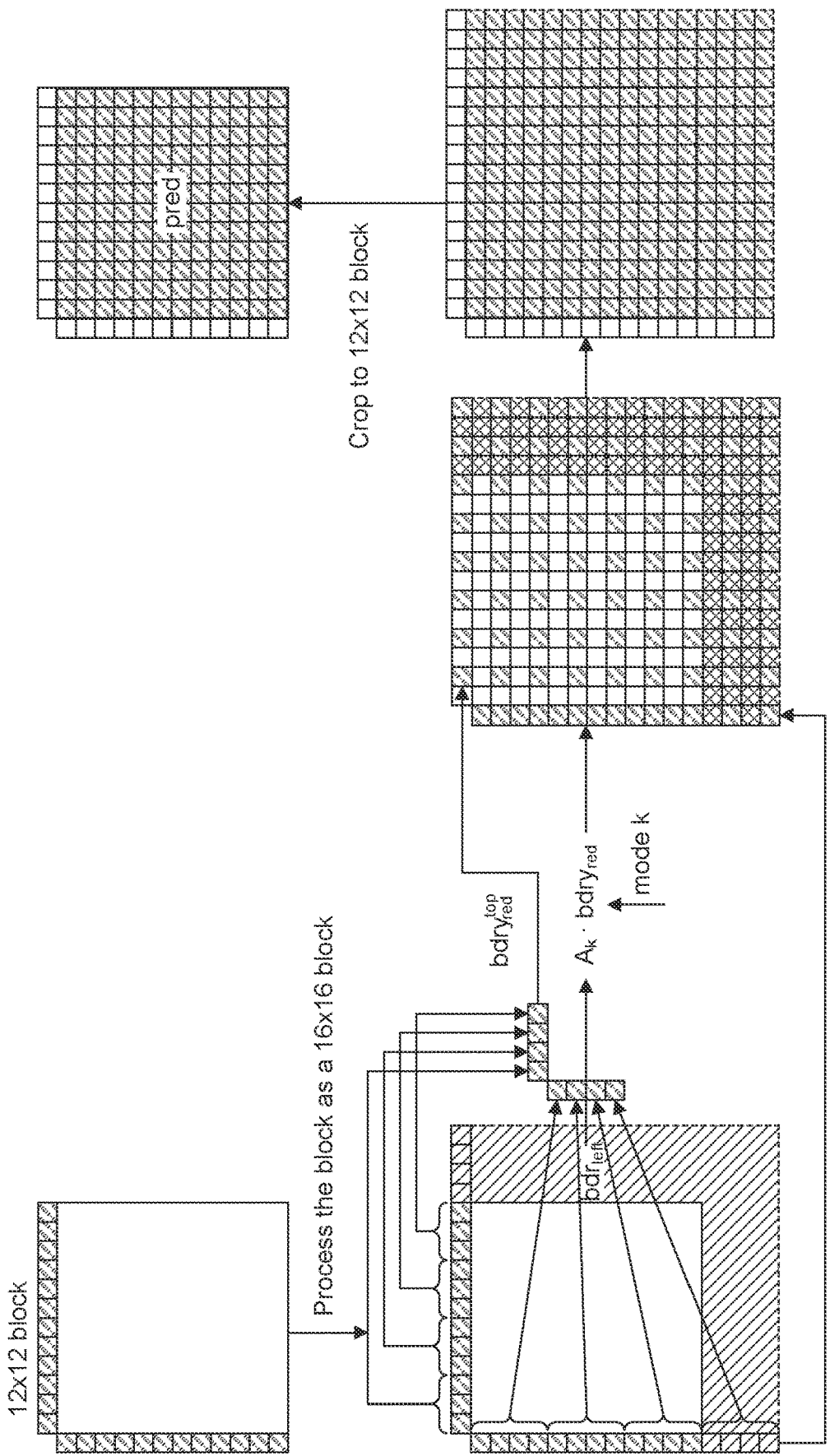
FIG. 16 illustrates a matrix based intra prediction process for a 12×12 block, according to an embodiment.

FIG. 16 illustrates the MIP process according to this embodiment. As can be seen, the proposal is to employ the unchanged MIP prediction process, but over a spatial area (e.g., 16×16) larger than the considered luma coding block (e.g., 12×12 block). Only a padding operation before the MIP prediction and a crop after the MIP prediction are added to the MIP intra prediction process.

Figure 17:
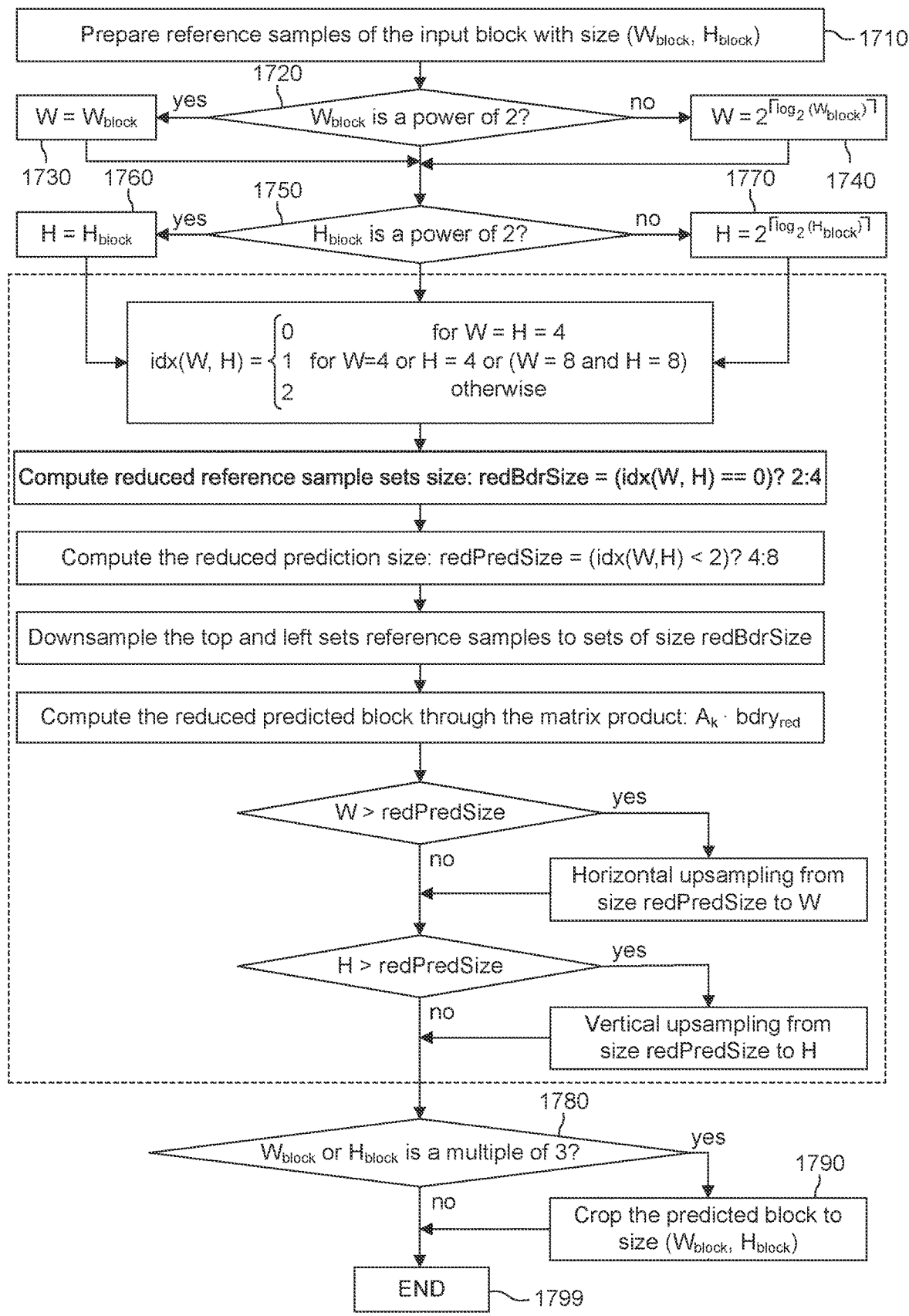
FIG. 17 illustrates MIP prediction of an enlarged block, which is a superset of the block to predict, according to an embodiment.

FIG. 17 illustrates the overall prediction process according to the present embodiment. The input to this process is the luma block to predict, with size ($W_{block}$, $H_{block}$). At step 1710, the encoder or decoder prepares the extended set of top and left reference samples of current block as is done for angular intra predication, as illustrated in FIG. 16.

At step 1720, the encoder or decoder checks if the width $W_{block}$ is a power of 2. If not, then the block width W considered during the MIP prediction is set (1740) equal to the minimum power of 2 that is higher than $W_{block}$: $W = 2^{\lceil log_2(W_{block}) \rceil}$. Otherwise W is simply set (1730) to $W_{block}$. At step 1750, the encoder or decoder checks if the height H block is a power of 2. If not, then the block width H considered during the MIP prediction is set (1770) equal to the minimum power of 2 that is higher than $H_{block}$: $H = 2^{\lceil log_2(H_{block}) \rceil}$. Otherwise H is simply set (1760) to $H_{block}$.

The following of the process enclosed in dashed lines in FIG. 17, consists in applying the MIP intra prediction process (e.g., using the process as shown in FIG. 15), onto the temporary block with size (W, H). This produces a MIP-predicted block with size (W, H). Then in case the size (W, H) is larger than the input size ($W_{block}$, $H_{block}$) (1780), then the MIP-predicted block is cropped (1790) down to size ($W_{block}$, $H_{block}$), by removing its bottom and right part, as shown in FIG. 16. The method ends at step 1799.

The advantage of this embodiment is an increased coding efficiency compared to the first embodiment. Indeed, this embodiment allows taking benefit from the MIP intra prediction for blocks resulting from ABT partitioning, as for other blocks that have a size equal to a power of 2 in width and height.

Third Embodiment: Adapt the Down-Sampling of the Boundary and the Up-Sampling of the Reduced Predicted Block to ABT In the third embodiment, we propose to adapt the down-sampling of the boundary reference samples and the up-sampling of the reduced predicted blocks, to the new block sizes introduced by ABT partitioning.

Figure 18:
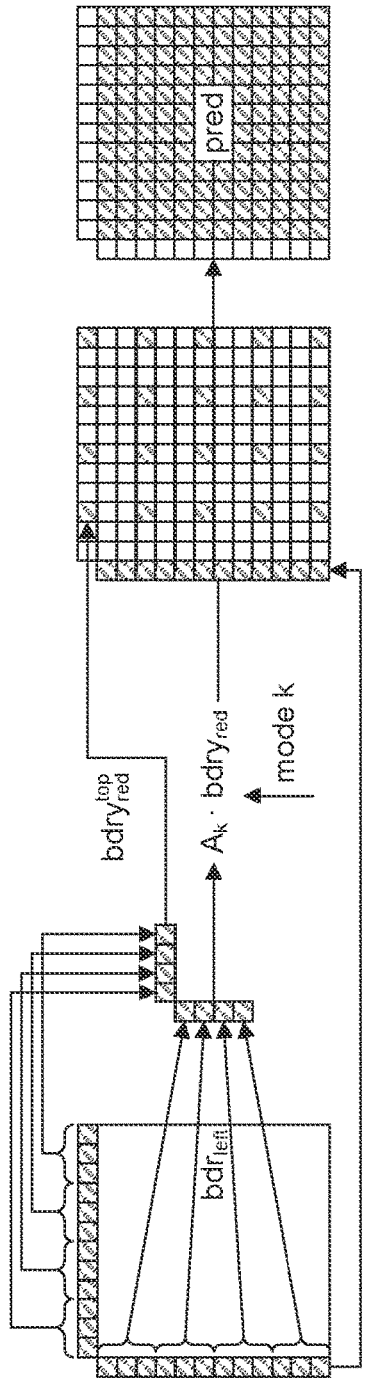
FIG. 18 illustrates an MIP prediction process according to an embodiment.
Figure 19:
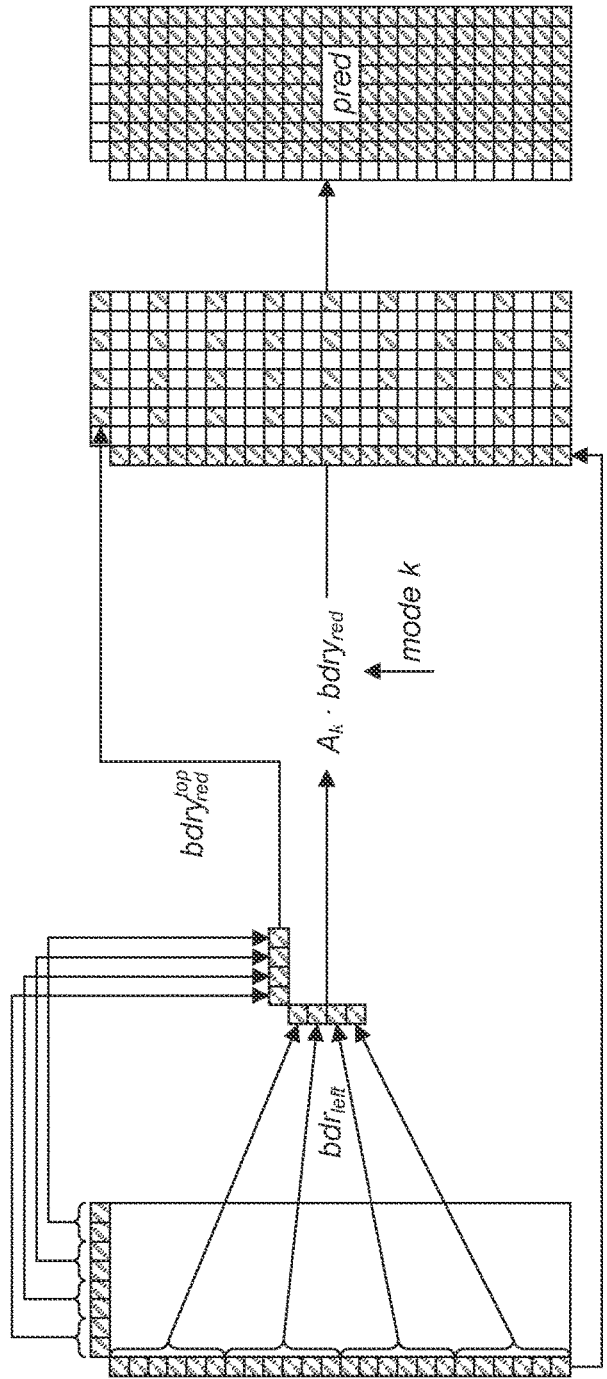
FIG. 19 illustrates adaptation of the up-sampling of the reduced predicted block, according to an embodiment.

The proposed modified MIP intra prediction process is illustrated in FIG. 18 and FIG. 19, respectively for the cases of an input block with size 12×12, and an input block with size 8×24.

According to the present embodiment, the reference samples down-sampling ratio is adapted to the initial block size and to the target reduced boundary size. For instance, if idx(W, H) is equal to 1 or 2, then the reduced boundaries sizes are equal to 4. Furthermore, if a block size width or height is equal to 12, then the down-sampling ratio is equal to 3 (e.g., FIG. 18). In case a block size width or height is equal to 24, then the down-sampling ratio is equal to 6 (e.g., FIG. 19).

The averaging of MIP to down-sampling the top and left lines of reference samples is then extended to support additional sub-sampling ratios, which are equal to $3*2^n$, n being typically comprised between 1 and 3. The generic averaging used to down-sample samples $s_i$ by a factor N is:

$$s = \left\lfloor \frac{\sum_{i=1}^{N} s_i + (N/2)}{N} \right\rfloor$$

A hardware friendly down-sampling with a ratio 3 is proposed, the following integer-based process is proposed:

$$s = \left\lfloor \frac{85 * \left(\sum_{i=1}^{3} s_i\right) + 128}{256} \right\rfloor = \left(85 * \left(\sum_{i=1}^{3} s_i\right) + 128\right) \gg 8$$

A hardware friendly down-sampling with a ratio 6 is proposed, the following integer-based process is proposed:

$$s = \left\lfloor \frac{85 * \left(\sum_{i=1}^{6} s_i\right) + 128}{512} \right\rfloor = \left(85 * \left(\sum_{i=1}^{6} s_i\right) + 128\right) \gg 9$$

More generally, the averaging by a ratio of $3 \cdot 2^n$ with a sufficiently good accuracy level is easily implemented in hardware thought the following process:

$$s = \left\lfloor \frac{85 \times \sum_{i=1}^{3 \cdot 2^n} s_i + 128}{256(n+1)} \right\rfloor = \left(85 * \left(\sum_{i=1}^{3 \cdot 2^n} s_i\right) + 128\right) \gg (8+n)$$

In addition to an adapted boundary reduction process, the up-sampling of the reduced predicted is also adapted to newly introduced block sizes.

To do so, the up-sampling ration $2^n$ is also supported in the process. The up-sampling in MIP is performed as a bilinear interpolation between two samples $s_1$ and $s_2$, which compute the interpolated sample $s_{int}$ between $s_1$ and $s_2$ under the following generic form:

$$s_{int} = \frac{d_2 \cdot s_1 + d_1 \cdot s_2}{d_1 + d_2} = \frac{d_2 \cdot s_1 + d_1 \cdot s_2}{r}$$

where r is the up-sampling ratio. In the case of block sizes equal to a power of two, the above interpolation is simple and easy to implement in a hardware friendly manner. In the case of the newly introduced block sizes with ABT, the up-sampling ratio is of the form $r=3 \cdot 2^n$.

$$s_{int} = \frac{d_2 \cdot s_1 + d_1 \cdot s_2}{3 \cdot 2^n} \approx (85 * (d_2 \cdot s_1 + d_1 \cdot s_2) + 128) \gg (8+n)$$

The above approximated interpolation is used in the present embodiment, as an accuracy enough integer-based implementation of the proposed interpolation process.

The method as shown in FIG. 15 can be modified to perform the modified MIP prediction process according to this embodiment. For example, the reference samples down-sampling (1540) and the reduced predicted block up-sampling (1570, 1590) are modified as previously described. Additionally, the computation (1510) of the MIP size idx(W, H) is also adapted for the combination of MIP with ABT. This consists, in the case of a block size equal to 12 in width or height, in setting idx(W, H) to 1. This way, the reduced reference lines will be of size 4, and not in size 8. This leads to a down-sampling ratio of 3 in the bock orientation where its size is 12. This provides a simple down-sampling process by an integer ratio 3, as previously described, which is easy to implement in hardware. This also leads to an up-sampling of the reduced predicted block with a ratio equal to 3 in the considered horizontal of vertical orientation, which is again easy to implement in hardware.

The advantage of the present embodiment is increased coding efficiency. To illustrate this, Table 3 shows the performance of the present embodiment compared to the second embodiment.

TABLE 3

| | | | | | | | |
|---|---|---|---|---|---|---|---|
| Class A1 | 70.93 | −0.17% | −0.17% | −0.24% | −0.18% | −0.22% | −0.21% |
| Class A2 | 93.49 | −0.09% | 0.39% | −0.04% | −0.09% | 0.42% | 0.02% |
| Class B | 19.92 | −0.10% | 0.07% | −0.08% | −0.08% | 0.02% | −0.07% |
| Class C | 5.40 | −0.09% | −0.26% | −0.21% | −0.10% | −0.26% | −0.20% |
| Class D | 0.99 | 0.00% | 0.17% | −0.62% | −0.01% | 0.15% | −0.58% |
| Class E | | | | | | | |
| Class F | 3.23 | 0.09% | 1.47% | 3.26% | 0.08% | 1.54% | 3.08% |
| All | 24.70 | −0.11% | 0.00% | −0.14% | −0.11% | −0.02% | −0.12% |

According to a variant of the above down-sampling process, the averaging weights [1, 2, 1] are used instead of the averaging weights [1, 1, 1], in the case of a down-sampling with a ratio equal to 3. This leads to the following averaging operation:

$$s = \left\lfloor \frac{s_1 + 2.s_2 + s_3}{4} \right\rfloor = (s_1 + s_3 + (s_2 \ll 1)) \gg 1$$

which is even simpler to implement in hardware.

In the same way, a down-sampling by a ratio of 6 may involve a simplified weighted averaging with the set of weights [1, 1, 2, 2, 1, 1], as follows:

$$s = \left\lfloor \frac{s_1 + s_2 + 2.s_3 + 2.s_4 + s_5 + s_6}{8} \right\rfloor =$$
$$(s_1 + s_2 + (s_3 \ll 1) + (s_4 \ll 1) + s_5 + s_6) \gg 3$$

which is also simpler to implement in hardware than the previously proposed approach.

Figure 20:
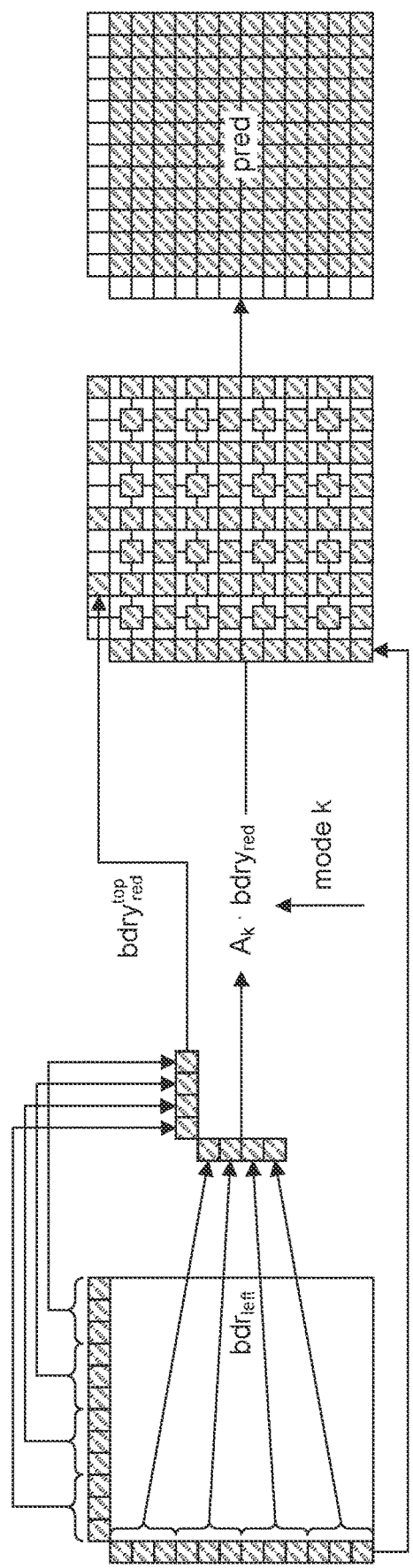
FIG. 20 illustrates an adapted up-sampling ratio for the case of block size 12, according to an embodiment.

Fourth Embodiment: Alternative Methods for the Up-Sampling of the Reduced Predicted Block for ABT According to a further embodiment as illustrated in FIG. 20, the adapted MIP prediction computes a reduced predicted block of size 8×8 in any case the initial block size is at least 8 and larger than 8 in a direction. The difference with previous embodiments is that for initial block size equal to 12, an up-sampling ratio of 3/2 is used.

Figure 21:
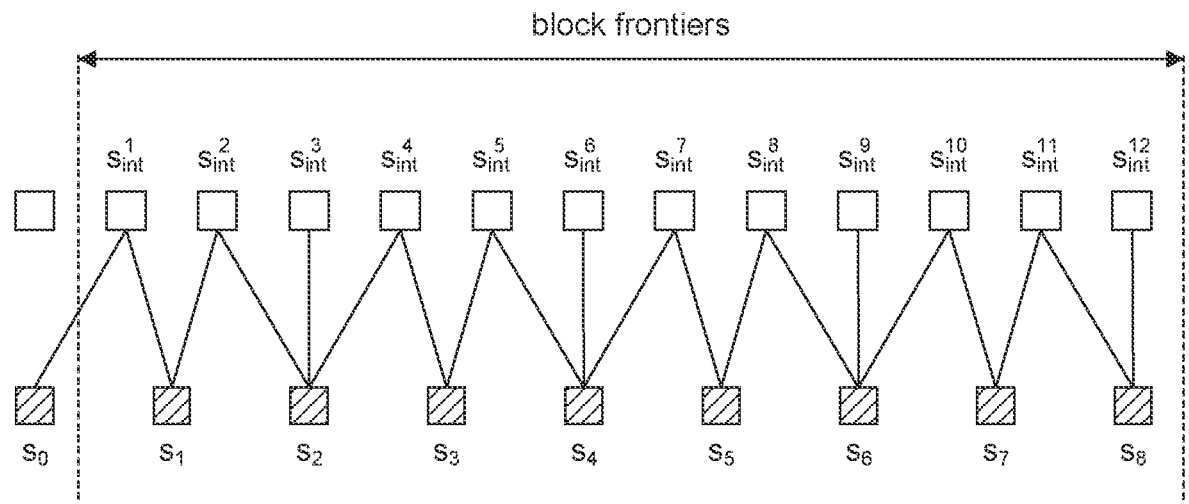
FIG. 21 illustrates up-sampling from reduced predicted block size 8 to final predicted block size 12, according to an embodiment.
Figure 22:
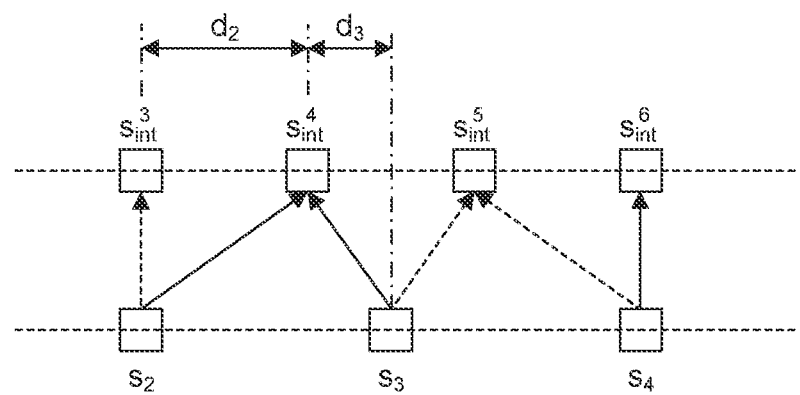
FIG. 22 illustrates a ratio of 3/2 for up-sampling from reduced predicted block size 8 to final predicted block size 12, according to an embodiment.

To do so, a specific interpolation process is needed, as illustrated in FIG. 21. The specific operations concern typically the computation of the interpolated samples which have non-zero phase relative position compared to the samples in the signal to be up-sampled. This is typically the sample $$s_{int}^4 \text{ and } s_{int}^5$$

of FIG. 22.

To compute $$s_{int}^4 \text{ and } s_{int}^5$$

of FIG. 22 the following operations are performed:

$$s_{int}^4 = \frac{d_3 \cdot s_2 + d_2 \cdot s_3}{d_2 + d_3} \text{ where } d_2 = \frac{1}{3} \text{ and } d_3 = \frac{1}{2} - \frac{1}{3} = \frac{1}{6}.$$

This leads to:

$$s_{int}^4 = \frac{s_2 + 2 \cdot s_3}{3} \approx (85 \times (s_1 + 2 \cdot s_2) + (1 \ll 7)) \gg 8$$

Similarly, $$s_{int}^5 = \frac{2.s_3 + s_4}{3} \approx (85 \times (2.s_3 + s_4) + (1 \ll 7)) \gg 8$$

The computation of other samples is similar to that of $$s_{int}^4 \text{ and } s_{int}^5$$

to obtain the up-sampled signal with size 12.

Figure 23:
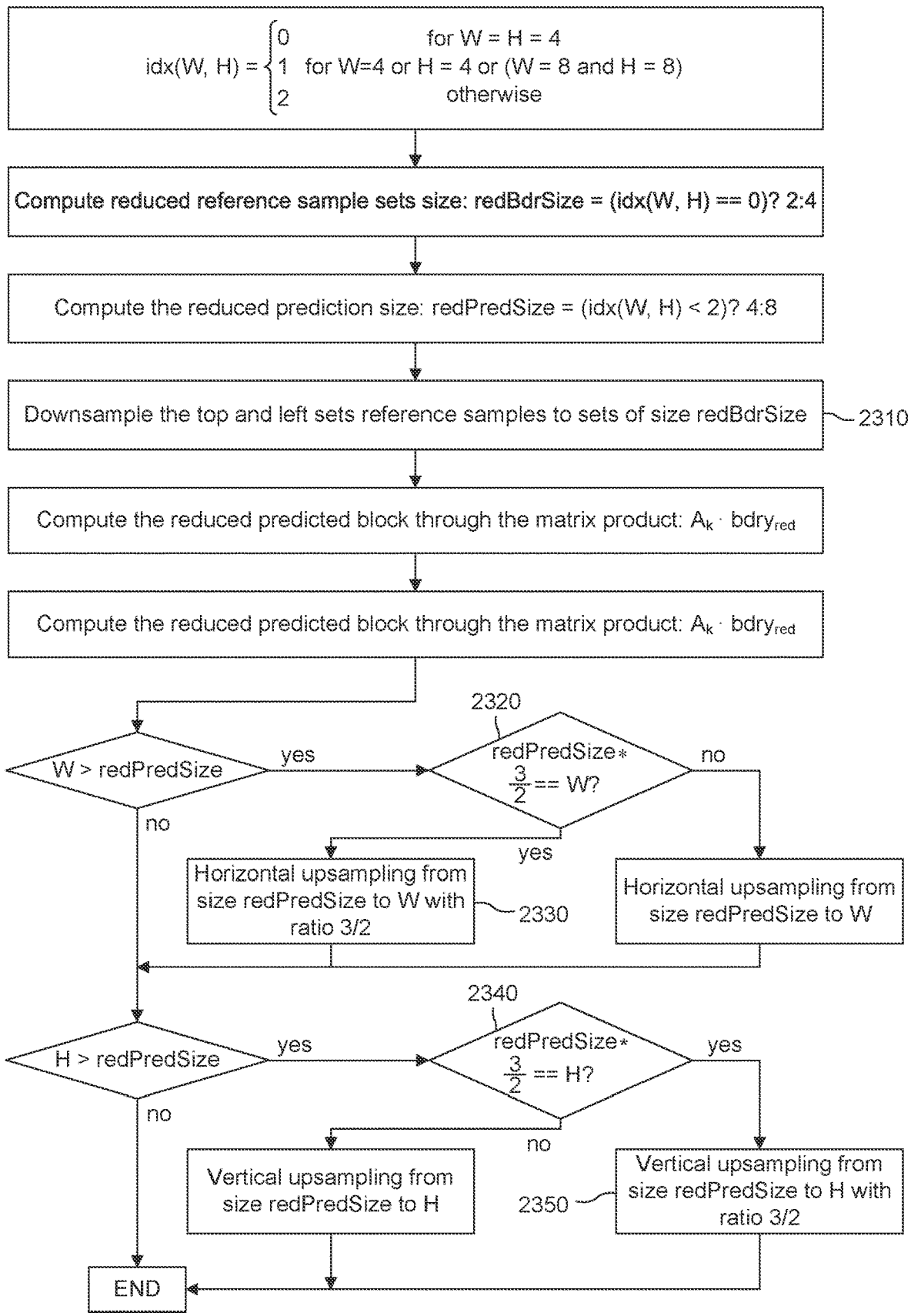
FIG. 23 illustrates up-sampling with a ratio of 3/2 for up-sampling the reduced predicted block of size 8 towards final block size 12, according to an embodiment.

The MIP prediction process as proposed in this embodiment is depicted in FIG. 23. As already explained, the steps modified by this embodiment compared to that of FIG. 15 concern the down-sampling (2310) of the reference samples, and the up-sampling of the reduced predicted block towards the final predicted block. The modifications consist, successively for the horizontal and vertical up-sampling stages, in checking if the up-sampling ratio is equal to 3/2 or not (2320, 2340). If not, then the up-sampling ratio is unchanged compared to the embodiment of FIG. 15. If it is equal to 3/2, then the proposed up-sampling for ratio 3/2, as described above, is applied (2330, 2350).

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various embodiments to modify an element, component, step, operation, etc., for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Various methods and other aspects described in this application can be used to modify modules, for example, the partitioning and intra prediction modules (202, 260, 335, 360), of a video encoder 200 and decoder 300 as shown in FIG. 2 and FIG. 3. Moreover, the present aspects are not limited to VVC or HEVC, and can be applied, for example, to other standards and recommendations, and extensions of any such standards and recommendations. Unless indicated otherwise, or technically precluded, the aspects described in this application can be used individually or in combination.

Various numeric values are used in the present application. The specific values are for example purposes and the aspects described are not limited to these specific values.

Various implementations involve decoding. "Decoding," as used in this application, may encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application may encompass all or part of the processes performed, for example, on an input video sequence in order to produce an encoded bitstream.

Note that the syntax elements as used herein are descriptive terms. As such, they do not preclude the use of other syntax element names.

The implementations and aspects described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus, for example, a processor, which refers to processing devices in general, including, for example, a computer, a microprocessor, an integrated circuit, or a programmable logic device. Processors also include communication devices, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a quantization matrix for de-quantization. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method of encoding, comprising:
accessing a block of a picture, wherein at least one of a width and a height of said block is different than a power of 2;
downsampling reference samples used for intra prediction of said block, with a downsampling ratio adapted to said width or height of said block, wherein downsampling is performed as:

$$s = \left\lfloor \frac{85 \times \sum_{i=1}^{3 \cdot 2^n} s_i + 128}{256(n+1)} \right\rfloor = \left(85 \cdot \left(\sum_{i=1}^{3 \cdot 2^n} s_i\right) + 128\right) \gg (8 + n),$$

wherein n is a positive integer and $s_i$ denotes a reference sample;
multiplying the downsampled references by a weight matrix in order to form a reduced predicted block; and upsampling said reduced predicted block, with an upsampling ratio adapted to said width or height of said block to form said intra prediction for said block.

2. The method of claim 1, wherein said width or height of said block is $3\times2^M$, wherein M is an integer.

3. The method of claim 1, wherein said downsampling ratio is further adapted to a size of said reduced predicted block.

4. The method of claim 1, wherein said downsampling ratio is $3\times2^n$.

5. A method of decoding, comprising:

downsampling reference samples used for intra prediction of a block of a picture, with a downsampling ratio adapted to said width or height of said block, wherein at least one of a width and a height of said block is different than a power of 2, wherein downsampling is performed as:

$$s = \left\lfloor \frac{85 \times \sum_{i=1}^{3\cdot2^n} s_i + 128}{256(n+1)} \right\rfloor = \left(85 \cdot \left(\sum_{i=1}^{3\cdot2^n} s_i\right) + 128\right) \gg (8+n),$$

wherein n is a positive integer and $s_i$ denotes a reference sample;

multiplying the downsampled references by a weight matrix in order to form a reduced predicted block; and upsampling said reduced predicted block, with an upsampling ratio adapted to said width or height of said block to form said intra prediction for said block.

6. The method of claim 5, wherein said width or height of said block is $3\times2^M$, wherein M is an integer.

7. The method of claim 5, wherein said downsampling ratio is further adapted to a size of said reduced predicted block.

8. The method of claim 5, wherein said downsampling ratio is $3\times2^n$.

9. An apparatus for video encoding, comprising one or more processors and at least one memory, wherein said one or more processors are configured to:

access a block of a picture, wherein at least one of a width and a height of said block is different than a power of 2;

downsample reference samples used for intra prediction of said block, with a downsampling ratio adapted to said width or height of said block, wherein downsampling is performed as:

$$s = \left\lfloor \frac{85 \times \sum_{i=1}^{3\cdot2^n} s_i + 128}{256(n+1)} \right\rfloor = \left(85 \cdot \left(\sum_{i=1}^{3\cdot2^n} s_i\right) + 128\right) \gg (8+n),$$

wherein n is a positive integer and $s_i$ denotes a reference sample;

multiply the downsampled references by a weight matrix in order to form a reduced predicted block; and upsample said reduced predicted block, with an upsampling ratio adapted to said width or height of said block to form said intra prediction for said block.

10. The apparatus of claim 9, wherein said width or height of said block is $3\times2^M$, wherein M is an integer.

11. The apparatus of claim 9, wherein said downsampling ratio is further adapted to a size of said reduced predicted block.

12. The apparatus of claim 9, wherein said downsampling ratio is $3\times2^n$.

13. An apparatus for video decoding, comprising one or more processors and at least one memory, wherein said one or more processors are configured to:

downsample reference samples used for intra prediction of a block of a picture, with a downsampling ratio adapted to said width or height of said block, wherein at least one of a width and a height of said block is different than a power of 2, wherein downsampling is performed as:

$$s = \left\lfloor \frac{85 \times \sum_{i=1}^{3\cdot2^n} s_i + 128}{256(n+1)} \right\rfloor = \left(85 \cdot \left(\sum_{i=1}^{3\cdot2^n} s_i\right) + 128\right) \gg (8+n),$$

wherein n is a positive integer and $s_i$ denotes a reference sample;

multiply the downsampled references by a weight matrix in order to form a reduced predicted block; and upsample said reduced predicted block, with an upsampling ratio adapted to said width or height of said block to form said intra prediction for said block.

14. The apparatus of claim 13, wherein said width or height of said block is $3\times2^M$, wherein M is an integer.

15. The apparatus of claim 13, wherein said downsampling ratio is further adapted to a size of said reduced predicted block.

16. The apparatus of claim 13, wherein said downsampling ratio is $3\times2^n$.

* * * * *